(12) United States Patent
Huang et al.

(10) Patent No.: US 11,706,163 B2
(45) Date of Patent: Jul. 18, 2023

(54) ACCELERATING DISTRIBUTED REINFORCEMENT LEARNING WITH IN-SWITCH COMPUTING

(71) Applicant: Board of Trustees of the University of Illinois, Urbana, IL (US)

(72) Inventors: Jian Huang, Champaign, IL (US); Deming Chen, Champaign, IL (US); Alexander Gerhard Schwing, Champaign, IL (US); Youjie Li, Changsha (CN)

(73) Assignee: The Board of Trustees of the University of Illinois, Urbana, IL (US)

( * ) Notice: Subject to any disclaimer, the term of this patent is extended or adjusted under 35 U.S.C. 154(b) by 161 days.

(21) Appl. No.: 17/247,611

(22) Filed: Dec. 17, 2020

(65) Prior Publication Data

US 2021/0194831 A1      Jun. 24, 2021

Related U.S. Application Data

(60) Provisional application No. 62/951,761, filed on Dec. 20, 2019.

(51) Int. Cl.
   *H04L 12/851* (2013.01)
   *H04L 12/931* (2013.01)
   (Continued)

(52) U.S. Cl.
   CPC .............. *H04L 49/90* (2013.01); *G06N 3/08* (2013.01); *H04L 69/22* (2013.01)

(58) Field of Classification Search
   CPC ..... H04L 49/90; H04L 47/2441; H04L 47/10; H04L 69/22; H04L 49/3027; H04L 47/32;
   (Continued)

(56) References Cited

U.S. PATENT DOCUMENTS 11,075,847 B1 *  7/2021  Kwan ...................... H04L 47/11
11,176,489 B1 * 11/2021  Smola ...................... G06F 9/547
(Continued)

OTHER PUBLICATIONS

Andreyev, A., "Introducing Data Center Fabric, the Next-Generation Facebook Data Center Network," https://code.fb.com/production-engineering/facebook-data-center-network/, 2014.
(Continued)

*Primary Examiner* — Edan Orgad
*Assistant Examiner* — Vanneilian Lalchinthang
(74) *Attorney, Agent, or Firm* — Lowenstein Sandler LLP

(57) ABSTRACT

A programmable switch includes an input arbiter to analyze packet headers of incoming packets and determine which of the incoming packets are part of gradient vectors received from worker computing devices that are performing reinforcement learning. The programmable switch also includes an accelerator coupled to the input arbiter, the accelerator to: receive the incoming packets from the input arbiter; asynchronously aggregate gradient values of the incoming packets, as the gradient values are received, to generate an aggregated data packet associated with a gradient segment of the gradient vectors; and transfer the aggregated data packet to the input arbiter to be transmitted to the worker computing devices, which are to update local weights based on the aggregated data packet.

22 Claims, 13 Drawing Sheets

(51) Int. Cl.
G06F 15/10 (2006.01)
G06N 20/00 (2019.01)
H04L 49/90 (2022.01)
H04L 69/22 (2022.01)
G06N 3/08 (2023.01)

(58) Field of Classification Search
CPC . H04L 65/61; H04L 65/4069; G06F 13/1605; G06F 21/55; G06F 40/106; G06F 17/243; G06F 12/023; G06F 3/0608; G06F 3/017; G06F 40/174; G06N 20/00; G06N 3/006; G06N 3/08
USPC ......................................................... 370/400
See application file for complete search history.

(56) References Cited

U.S. PATENT DOCUMENTS

| | | | | |
|---|---|---|---|---|
| 11,328,222 | B1* | 5/2022 | Matthews | H04L 49/3027 |
| 2008/0285571 | A1* | 11/2008 | Arulambalam | H04L 65/613 |
| | | | | 370/400 |
| 2010/0272117 | A1* | 10/2010 | Wu | H04L 49/101 |
| | | | | 370/413 |
| 2017/0237672 | A1* | 8/2017 | Dalal | G06F 13/404 |
| | | | | 370/235 |
| 2017/0308789 | A1* | 10/2017 | Langford | G06N 7/005 |
| 2018/0089122 | A1* | 3/2018 | Oz | G06F 13/37 |
| 2019/0138934 | A1* | 5/2019 | Prakash | H04L 43/08 |
| 2019/0199602 | A1* | 6/2019 | Zhang | G06F 8/31 |
| 2022/0200893 | A1* | 6/2022 | Yao | H04L 45/74 |

OTHER PUBLICATIONS

Baba Arimilli, L. et al., "The PERCS High-Performance Interconnect," Proceedings of the 18th IEE Symposium on High Performance Interconnects (HOTI'10), Santa Clara, CA, 2010.
"Atari Games: Much More Than Video Games," https://www.atari.com, retrieved Feb. 4, 2021.
Benson, T. et al., "Network Traffic Characteristics of Data Centers in the Wild," Proceedings of the 10th ACM SIGCOMM conference on Internet measurement, Melbourne Austrailia, 2010.
Bosshar, P. et al., "P4: Programming Protocol-Independent Packet Processors," ACM SIGCOMM Computer Communication Review 44, Jul. 3, 2014.
Chen, D. et al., "The IBM Blue Gene/Q Interconnection Network and Message Unit," In the Proceeding of 2011 International Conference for High Performance Computing, Networking, Storage and Analysis (SC'11), Seattle, Washington, 2011.
Dean, J. et al., "Large Scale Distributed Deep Networks," Proceedings of the 25th International Conference on Neural Information Processing Systems (NIPS'12), Lake Tahoe, NV 2012.
Dhariwal, P. et al., "OpenAi Baselines," https://github.com/openai/baselines, retrieved Feb. 4, 2021.
Yerzat, D., "DQN Adventure," https://github.com/higgsfield/RL-Adventure, retrieved Feb. 4, 2021, 2018.
Facebook, "Writing Distributed Applications with PyTorch," https://pytorch.org/tutorials/intermediate/dist_tuto.html, retrieved Feb. 4, 2021, 2018.
Gauci, J. et al., "Horizon: Facebooks' Open Source Applied Reinforcement Learning Platform," arXivarXiv/1811.00260, https://arxiv.org/ab/1811.00260, retrieved Feb. 4, 2021, 2018.
Goyal, P. et al., "Accurate Large Minibatch Sgd: Training ImageNet in 1 Hour," arXivarXiv/1706.02677, https://arxiv.org/abs/1706.02677, retrieved Feb. 4, 2021, 2017.
Network Working Group, "Requirement for Comments: 3168," https://tools.ietf.org/html/rfc3168, retrieved Feb. 4, 2021, 2001.
He, K. et al., "Deep Residual Learning for Image Recognition," Proceedings of the IEEE Conference on Computer Vision and Pattern Recognition (CVPR'16), Las Vegas, NV, 2016.
Ho, Q. et al., More Effective Distributed ML via a Stale Synchronous Parallel Parameter Server, Proceeding of the 26th International Conference on Neural Information Processing Systems (NIPS'13), 2013.
Kostrikov, I., "DDPG and NAF," https://github.com/ikostrikov/pytorch-ddpf-naf, retrieved Feb. 4, 2021, 2018.
Kostrikov, I., "Pytorch-A2C-Acktr," https://github.com/ikostrikov/pytorch-a2c-ppo-acktr, retrieved Feb. 4, 2021, 2018.
Intel Corporation, "Intel X540," https://www.intel.com/content/www/us/en/ethernet-products/converge-network-adapters/ethernet-x540-t2-brief.html, retrieved Feb. 4, 2021, 2017.
Intel Corporation, "Xeon CPU E5," https://www.intel.com/content/www/us/en/products/processors/xeon/e5-processors.html, retrieved Feb. 4, 2021, 2017.
Jouppi, N.P, et al., "In-Datacenter Performance Analysis of a Tensor Processing Unit," Proceedings of the 44th International Symposium on Computer Archiecture (ISCA'17), Toronto, Canada, 2017.
Langford, J. et al., "Slow Learners are Fast," Proceedings of the 22nd International Conference on Neural Information Processing Systems (NIPS'09), Vancouver, Canada, 2009.
Leiserson, C.E. et al., "The Network Architecture of the Connection Machine CM-5," J. Parallel and Distrib. Comput. 33, 1996, http://www.sciencedirect.com/science/article/pii/S0743731596900337, retrieved Feb. 4, 2021.
Li, M. et al., "Communication Efficient Distrubuted Machine Learning with the Parameter Server," Proceeding so the 27th International Conference on Neural Information Processing Systems (NIPS'14), Montreal Canada, 2014.
Li, Y. et al., "A Network-Centric Hardware/Algorithm Co-Design to Accelerate Distributed Training of Deep Neural Networks," Proceedings of the 51st IEEE/ACM International Symposium on Microarchitecture (MICRO'18), Fukuoka City, Japan, 2018.
Li, Y. et al., "Pipe-SGD: A Decentralized Pipelined SGD Framework for Distributed Deep Net Training," Proceedings of the 32nd Conference on Neural Information Processing Systems (NIPS'18), Montreal, Canada.
Lian, X et al., "Asynchronous Decentralized Parallel Stochastic Gradient Descent," arXiv arXiv/1710.06952v3 (2017), http://arxiv.org/abs/1710.06952v3, retrieved Feb. 4, 2021, 2017.
Lillicrap, T.P. et al., "Continuous Control with Deep Reinforcement Learning," arXiv abs/1509.02971 (2015), http://arxiv.org/abs/1509.02971, retrieved Feb. 4, 2021, 2015.
Mahajan, D. et al., TABLA: A Unified Template-based Framework for Accelerating Statistical Machine Learning, Proceedings of the 2016 IEEE International Symposium on High-Performance Computer Architecture (HPCA'16), Barcelona, Spain, 2016.
Mnih, V. et al., "Asynchronous Methods for Deep Reinforcement Learning," arXiv arXiv/1602.01783 (2016), http://arxiv.org/abs/1602.01783, retrieved Feb. 4, 2021.
Mnih, V. et al., "Playing Atari with Deep Reinforcement Learning," arXiv arXiv/13125602 (2013), http://arxiv.org/abs/1312.5602, retrieved Feb. 4, 2021.
Moritz, P. et al., "Ray: A Distributed Framework for Emerging AI Applications," Proceeding of the 13th USENIX Symposium on Operating Systems Design and Implementation (OSDI'18), Carlsbad, CA, 2018.
Nair, A. "Massively Parallels Methods for Deep Reinforcement Learning," ArXiv ArXiv/1507.04296 (2015), http://arxiv.org/abs/1507.04296, retrieved Feb. 4, 2021.
NetFPGA-SUME, 2014, https://netfpga.org/site/#/systems/1netfpga-sume/details/, retrieved Feb. 4, 2021.
NetFPGA SUME Team, 2019, NetFRGA-SUME—Wiki, https://github.com/NetFPGA/NetFPGA-SUME-public, retrieved Feb. 4, 2021.
NETGEAR Corporation, "ProSafe XS712T Switch," 2017, https://www.netgear.com/support/product/xs712t.apsx, retrieved Feb. 4, 2021.
Nishihara, R. et al., "Real-Time Machine Learing: The Missing Pieces," Proceedings of the 16th Workshop on Hot Topics in Operating Systems (HotOS'17), Whistler, Canada, 2017.
NVIDIA Corporation, "NVIDIA CuDNN," 2018, https://developer.nvidia.com/cudnn, retrieved Feb. 4, 2021.
NVIDIA Coproration, "NVIDIA TITAN RTX," 2019, https://www.nvidia.com/en-us/titan/titan-rtx/, retrieved Feb. 4, 2021.

(56) References Cited

OTHER PUBLICATIONS

OpenAI, "OpenAI Baselines: ACKTR & A2C," 2017, https://blog.openai.com/baselines-acktr-a2c/, retrieved Feb. 4, 2021.

OpenAI, "OpenAI: Gym," 2018, https://gym.openai.com/, retrieved Feb. 4, 2021.

OpenMPI Community, "OpeanMPI: A High Performance Message Passing Library," https://www.open-mpi.org/, retrieved Feb. 4, 2021.

Park, J. et al., "Scale-Out Acceleration for Machine Learning," In Proceedings of the 50th IEEE/ACM International Symposium on Microarchitecture (MICRO'17), Boston, MA 2017.

Paszke, A. et al., "Automatic Differentiation in PyTorch," Proceedings of the 30th International Conference on Neural Information Processing Systems (NIPS'17), 2017.

Recht, B. et al., "Hogwild: A Lock-Free Approach to Parallelizing Stochastic Gradient Descent," Proceedings of the 24th International Conference on Neural Information Processing Systems (NIPS'11), 2011.

Roy, A. et al., "Inside the Social Network's (Datacenter) Network," Proceeding of the 2015 ACM SIGCOMM Conferences (SIGCOMM'15), London, UK, 2015.

Schulman, J. et al., "Proximal Policy Optimizaton Algorithms," arXiv arXiv/1707.06347 (2017), http://arxiv.org/abs/1707.06347, retrieved Feb. 4, 2021.

Shahbaz, M. et al., "PISCES: A Programmable, Protocol-Independent Software Switch," Proceedings of the 2016 ACM SIGCOMM Conference (SIGCOMM'16), Florianopolis, Brazil, 2016.

Singh, A. et al., "Jupiter Rising: A Decade of Clos Topologies and Centralized Control in Google's Deatacenter Network," Proceedings of the 2015 ACM SIGCOMM Conference (SIGCOMM'15), London, UK, 2015.

Thakur, R. et al., "Optimization of Collective Communication Operations in MPICH," The International Journal of High Performance Computing Applications 19 (2005).

Todorov, E. et al., "MuJoCo: A Physics Engine for Model-Based Control," IEEE/RSJ International Conference on Intelligent Robots and Systems, Vilamoura, Portugal, 2015.

Varshavskaya, P. et al., "Efficient Distributed Reinforcement Learning Through Agreement," Proceedings of the 9th International Symposium on Distributed Autonomous Robotic Systems (DARS), Tsukuba, Japan, 2008.

Wang, Q. et al., "Liquid State Machine Based Pattern Recognition on FPGA with Firing-Activity Dependent Power Gating Approximate Computing," Proceeding of the IEEE International Symposium on Circuits and Systems (ISCAS'16), Montreal, Canada, 2016.

Wang, Q. et al., "Energy Efficient Parallel Neuromorphic Archituectures with Approximate Arithmetic on FPGA," Neurocomputing 221 (2017), http://www.sciencefirect.com/science/article/pii/S0925231216311213.

Yu, M. et al., "GradiVeQ: Vector Quantization for Bandwidth-Efficient Gradient Aggregation in Distributed CNN Training," Proceeding of the 32nd Conference on Neural Information Processing Systems (NIPS'18), Montreal, Canada, 2018.

Yu, Y. et al., "Dynamic Control Flow in Large-Scale Machine Learning," Proceeding of the 13rd EuroSys Conference (EuroSys'18), Porto, Portugal, 2018.

Zhang, X. et al., "High-Performance Video Content Recognition with Long-Term Recurrent Convolutional Network for FPGA," 2017 27th International Conference on Field Programmable Logic and Applications (FPL'17), Ghent, Belgium, 2017.

Zhang, X. et al., "DNNBuilder: An Automated Tool for Building High-Performance DNN Hardware Accelerators for FPGA's," Proceeding of the International Conference on Computer-Aided Design (ICCAD'18), Marrakech, Morocco, 2018.

* cited by examiner

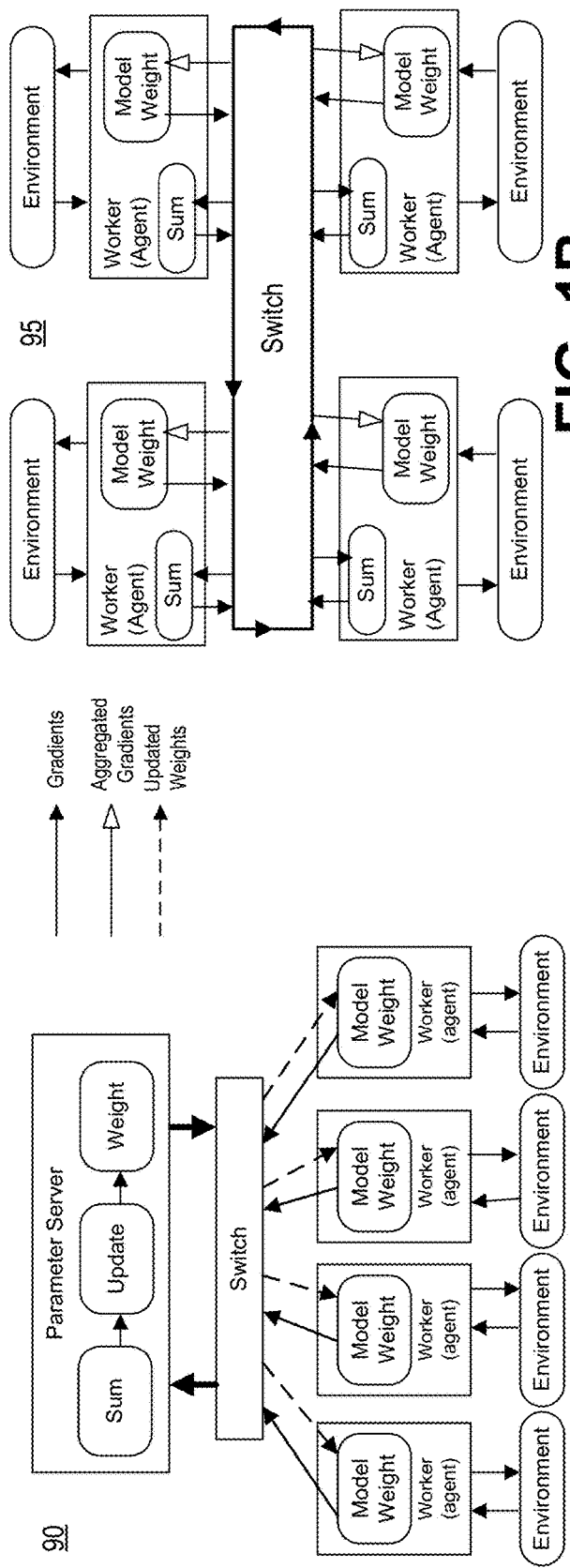
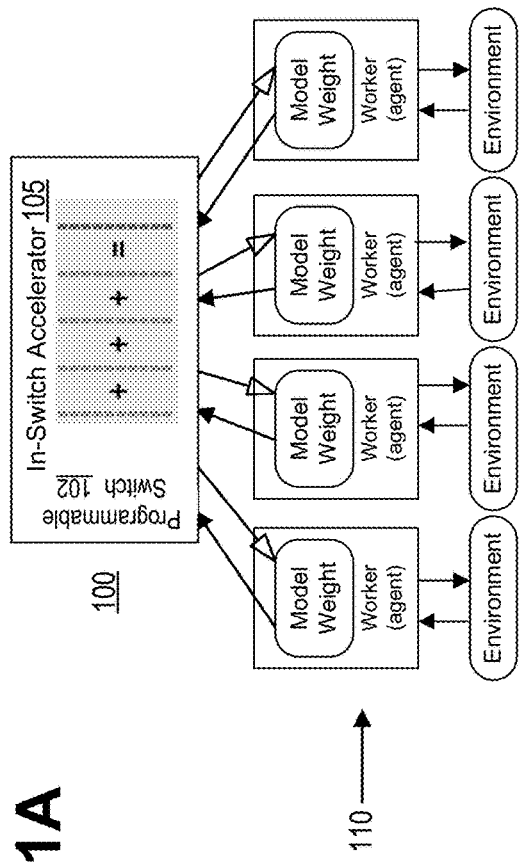

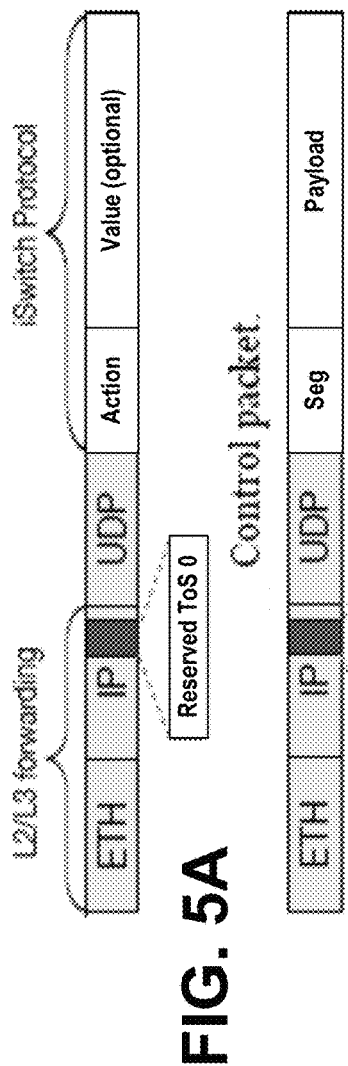
FIG. 5A
FIG. 5B
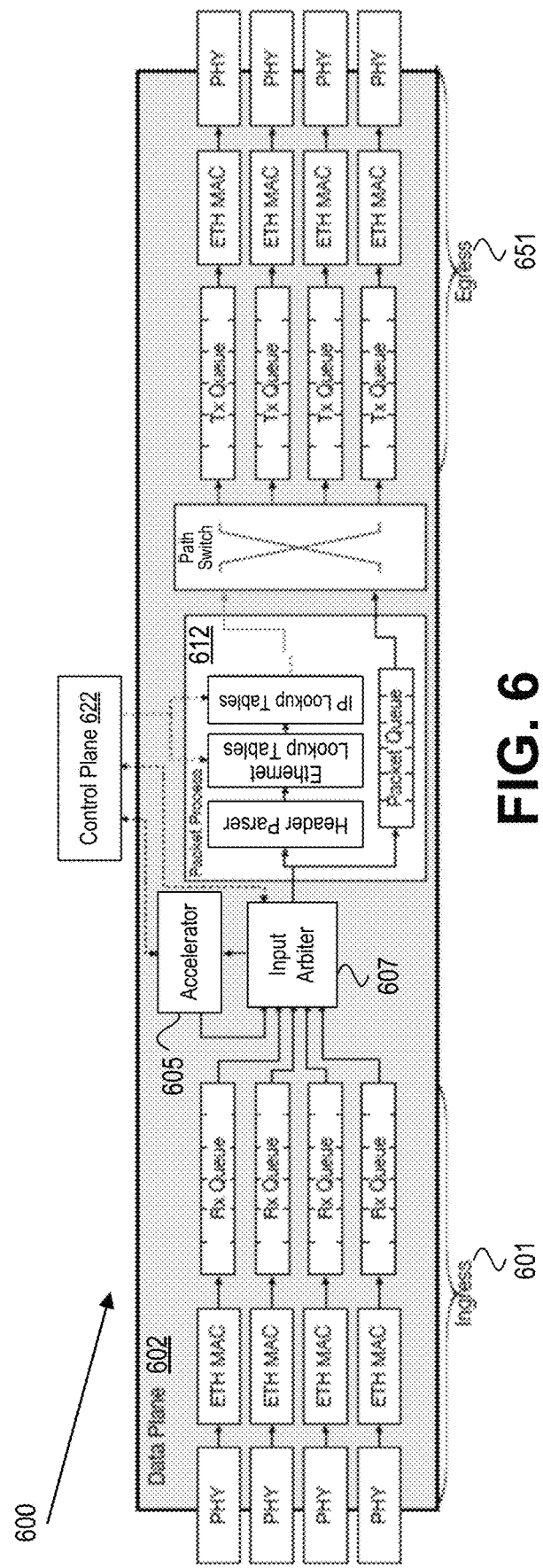
FIG. 6

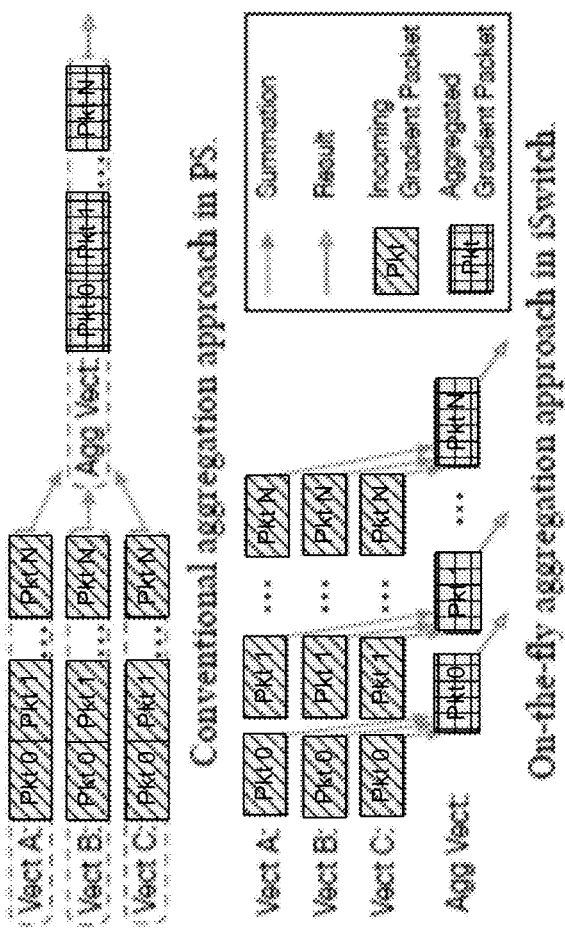
FIG. 8A
Prior Art
FIG. 8B
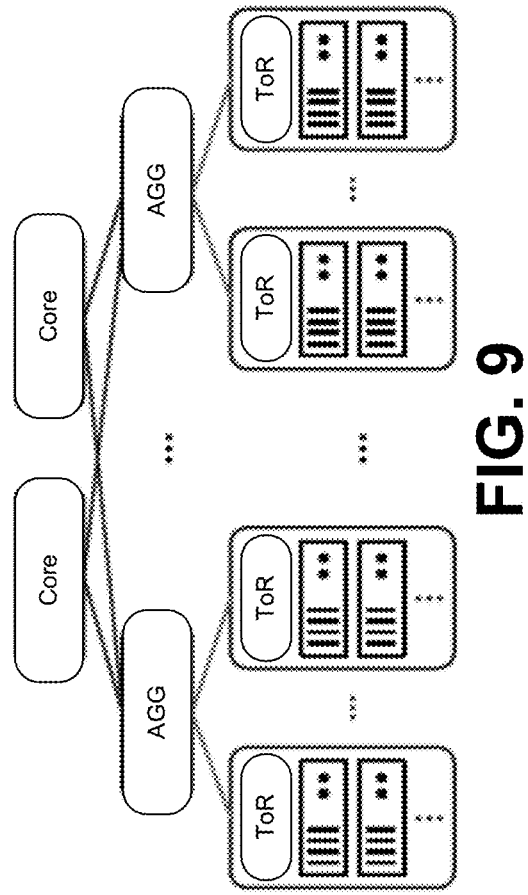
FIG. 9

Algorithm 1 Asynchronous distributed training algorithm with in-switch acceleration (logical view)

In the switch

1: Initialize gradient buffer $g_{sum}$, the number of gradient vectors to aggregate $H$ (= the number of child nodes, by default).
2: while true do
3:     wait until $H$ gradient vectors received
4:     sum-reduce the $H$ gradient vectors into $g_{sum}$
5:     broadcast back summed gradients $g_{sum}$
6: end while

On "Local Weight Update (LWU)" thread of each worker

1: Initialize iteration index $t_s$, total number of iterations $T$, the same initial weight $w_s$ over workers, and learning rate $\gamma$.
2: for $t_s = 0 \ldots T$ do
3:     wait until $g_{sum}$ received
4:     update weight: $w_s \leftarrow w_s - \gamma \cdot g_{sum}/H$
5: end for

On "Local Gradient Computing (LGC)" thread of each worker

1: Initialize copy of iteration index $t_w$, copy of weight $w_w$, and staleness bound $S$. ($t_s$, $T$, $w_s$ are in shared/global memory.)
2: while $t_s < T$ do
3:     copy iteration index: $t_w \leftarrow t_s$
4:     copy updated weight: $w_w \leftarrow w_s$
5:     interact *environment* and collect *trajectory* based on $w_w$
6:     compute gradient $g_w$ based on collected *trajectory* and $w_w$
7:     // check staleness of local gradient before commit
8:     if $(t_s - t_w \leq S)$ then
9:         nonblocking send $g_w$ to switch
10:     else
11:         continue
12:     end if
13: end while

FIG. 11

PPO-Sync

PPO-Async

DDPG-Sync

DDPG-Async

1600

```
┌─────────────────────────────────────────────────────────┐
│ Analyze, by an input arbiter, packet headers of incoming│
│ packets of a programmable switch to determine which of  │
│ the incoming packets are part of gradient vectors       │
│ received from worker computing devices that are         │
│ performing reinforcement learning.                      │
│                        1610                             │
└─────────────────────────────────────────────────────────┘
                            │
                            ▼
┌─────────────────────────────────────────────────────────┐
│ Transfer, by the input arbiter, the incoming packets    │
│ containing the gradient vectors to an accelerator       │
│ coupled to the input arbiter.                           │
│                        1620                             │
└─────────────────────────────────────────────────────────┘
                            │
                            ▼
┌─────────────────────────────────────────────────────────┐
│ Aggregate, by the accelerator, gradient values of the   │
│ incoming packets, as the gradient values are received,  │
│ to generate an aggregated data packet associated with a │
│ gradient segment of the gradient vectors.  1630         │
└─────────────────────────────────────────────────────────┘
                            │
                            ▼
┌─────────────────────────────────────────────────────────┐
│ Transfer, by the accelerator, the aggregated data packet│
│ to the input arbiter.  1640                             │
└─────────────────────────────────────────────────────────┘
                            │
                            ▼
┌─────────────────────────────────────────────────────────┐
│ Transfer, by the input arbiter, the aggregated data     │
│ packet to a packet handling processor of the            │
│ programmable switch to be transmitted to the worker     │
│ computing devices, which are to update local weights    │
│ based on the aggregated data packet.  1650              │
└─────────────────────────────────────────────────────────┘
```

FIG. 16

ACCELERATING DISTRIBUTED REINFORCEMENT LEARNING WITH IN-SWITCH COMPUTING

REFERENCE TO EARLIER FILED APPLICATION

This application claims the benefit under 35 U.S.C. § 119(e) of U.S. Provisional Patent Application No. 62/951,761, filed Dec. 20, 2019, which is incorporated herein, in its entirety, by this reference.

TECHNICAL FIELD

Embodiments of the disclosure relate generally to machine learning, and more specifically, relate to accelerating distributed reinforcement learning with in-switch computing.

BACKGROUND

Reinforcement learning (RL) has attracted much attention recently, as new and emerging artificial intelligence-based applications are demanding the capabilities to intelligently react to environmental changes. Unlike distributed deep neural network (DNN) training, distributed RL training has its unique workload characteristics, namely distributed RL training generates orders of magnitude more iterations with much smaller sized but more frequent gradient aggregations. More specifically, experiments with typical RL algorithms show that distributed training for RL learning is latency critical and that the network communication for gradient aggregation occupies up to 83.2% of the execution time of each training iteration. This latency is a significant cost to RL learning, and is debilitative as workloads get larger.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 1A is a block diagram that illustrates a distributed reinforcement learning (RL) training system using a central parameter server, according to an embodiment.

FIG. 1B is a block diagram that illustrates a distributed RL training system using AllReduce-based training, according to an embodiment.

FIG. 1C is a block diagram that illustrates a distributed RL training system using in-switch acceleration, according to various embodiments.

FIG. 5A is a block diagram illustrating a format of a control packet according to various embodiments.

FIG. 5B is a block diagram illustrating a format of a data packet according to various embodiments.

FIG. 6 is a block diagram illustrating system architecture of an accelerator-based switch according to an embodiment.

FIG. 8A is a packet-based flow diagram of conventional gradient aggregation using a parameter server approach.

FIG. 8B is a packet-based flow diagram of gradient aggregation using an accelerator-based switch according to disclosed embodiments.

FIG. 9 is a simplified block diagram illustrating a typical network architecture at rack scale according to an embodiment.

FIG. 11 illustrates sets of psuedocode for Algorithm 1, asynchronous distributed training algorithm with in-switch acceleration according to various embodiments.

FIG. 16 is a flow chart of a method for accelerating distributed reinforcement learning with in-switch computing according to an embodiment.

DETAILED DESCRIPTION

Figure 2:
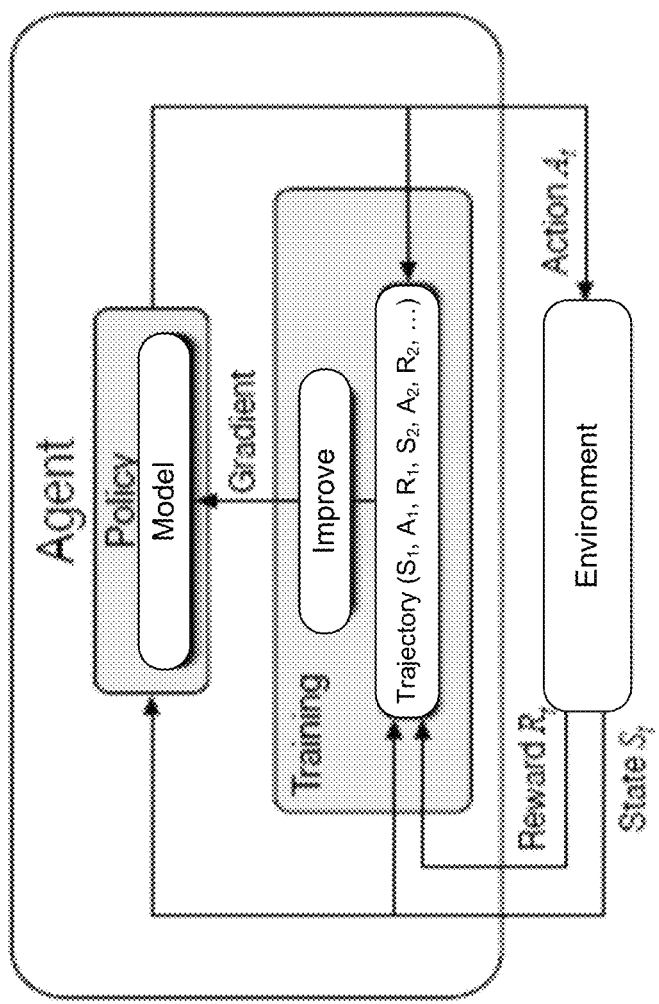
FIG. 2 is a simplified flow diagram of distributed RL training according to an embodiment.

By way of introduction, the present disclosure relates to accelerating distributed reinforcement learning with in-switch computing. There has been observed a disruptive trend that new and emerging Artificial Intelligence (AI) applications are increasingly operating in dynamic environments and are taking actions to react to environmental changes. These requirements of the emerging AI applications are naturally satisfied by reinforcement learning (RL). Similar to other popular machine learning techniques such as deep neural networks (DNN), RL also demands distributed training to improve performance and training results based on the ever-growing need of analyzing larger amounts of data and training more sophisticated models.

TABLE 1

A study on popular RL algorithms.

| | RL Algorithm | | | |
| --- | --- | --- | --- | --- |
| | DQN | A2C | PPO | DDPG |
| Environment | Atari | Atari | MuJoCo | MuJoCo |

TABLE 1-continued

A study on popular RL algorithms.

| | RL Algorithm | | | |
|---|---|---|---|---|
| | DQN | A2C | PPO | DDPG |
| Model Size | 6.41 MB | 3.31 MB | 40.02 KB | 157.52 KB |
| Training Iteration | 200.00M | 2.00M | 0.15M | 2.50M |

Unlike distributed DNN training, the distributed RL training generates orders of magnitude more iterations with much smaller sized gradient aggregations. According to our study on popular RL algorithms (see Table 1), a typical RL algorithm will generate millions of iterations, while its model size is much smaller than the size of a typical DNN model. Therefore, the latency of gradient communication in each iteration is a factor that significantly affects the performance of the distributed RL training.

To support distributed RL training, the state-of-the-art systems typically use one of two approaches. The systems either adopt the centralized parameter servers, in which the local gradient on each worker is aggregated to the central servers to perform weight update, or use the AllReduce based training, in which the gradient aggregation is conducted in a decentralized manner.

FIG. 1A is a block diagram that illustrates a distributed reinforcement learning (RL) training system 90 using a central parameter server, according to an embodiment. In this central parameter server approach, it is well known that the centralized parameter server is the bottleneck that limits the scalability of distributed training, as training workers (e.g., worker computing devices) have to interact with the central server to transmit gradient or receive updated weight in each iteration. Considering that millions of iterations are involved in RL training, this bottleneck will significantly affect the training performance.

FIG. 1B is a block diagram that illustrates a distributed RL training system 95 using AllReduced-based training, according to an embodiment. This AllReduced-based approach is proposed to address the scalability issue via performing gradient aggregation in a circular manner. However, this approach requires more network hops through switches to complete aggregation on gradients of all the workers (e.g., working computing devices) in a cluster. As the training is scaled with more computing nodes, the number of network hops required for gradient aggregations will be linearly increased.

To further understand the performance characteristics of these approaches, we quantify the overheads of the critical components in the distributed training with various RL algorithms such as Deep-Q Network (DQN), Advantage Actor Critic (A2C), Proximal Policy Optimization (PPO) and Deep Deterministic Policy Gradients (DDPG). Study results show that the network communication for gradient aggregation takes 49.9% to 83.2% of the execution time of each iteration (see FIGS. 4A-4B).

FIG. 1C is a block diagram that illustrates a distributed RL training system 100 using in-switch acceleration, according to various embodiments. The distributed RL training system 100, for example, includes a programmable switch 102 that is to leverage an in-switch accelerator 105 that communicates with a number of worker computing devices 110, also known as agents, participating in the reinforcement learning. The in-switch accelerator 105 is to provide gradient aggregation within one or more programmable switches.

In various embodiments, use of in-switch acceleration is proposed as a practical and effective solution based on three observations. First, as discussed, the gradient aggregation is the major bottleneck in distributed RL training and it incurs significant network communication overhead. Moving the gradient aggregation from server nodes into network switches can significantly reduce the number of network hops required. Second, programmable switches have been widely deployed in data centers today. Programmable switches 102 provide the flexibility and basic computational capacity for developers to program the hardware, which simplifies the accelerator-based implementation. Third, the switching techniques have been developed for decades with the purpose of scaling clusters. In-switch computing can scale the distributed RL training by leveraging the existing hierarchical rack-scale network architecture.

The disclosed accelerator-based approach benefits both the synchronous and asynchronous distributed RL training. In synchronous training, the worker computing systems 110 are blocked during gradient aggregation in each iteration. The in-switch accelerator 105 reduces the end-to-end network communication overhead, and thus alleviates the blocking time. Moreover, since the in-switch accelerator 105 conducts in-switch aggregation at the granularity of network packets rather than entire gradient vectors (each of which includes numerous network packets), the distributed RL training system 100 further reduces the synchronization overhead caused by the aggregation.

For asynchronous distributed RL training, each worker (or agent) runs independently without being blocked. However, due to the asynchrony, the removed blocking overhead is traded with staleness of local weight and gradient in training workers (e.g., worker computing devices), which hurts the training convergence and increases the number of training iterations. The distributed RL training system 100 improves the convergence as the faster network communication enables workers to commit fresher gradients. Therefore, the training can converge in a fewer number of iterations. To further increase the parallelism of the asynchronous distributed RL training, the RL training algorithms are revised and fully pipelined in execution of local gradient computing, aggregation, and weight updates.

Furthermore, the distributed RL training system 100 scales the distributed RL training at rack scale. The distributed RL training system 100 utilizes the existing rack-scale network hierarchy and integrates the in-switch accelerators into different layers of switches to conduct the hierarchical aggregation. The distributed RL training system 100 requires minimal hardware cost by extending the network protocols and control/data plane of programmable switches. As an extension to the programmable switch 102, the distributed RL training system 100 does not affect regular network functions of the programmable switch.

For purposes of experimentation, a real-world NetFPGA board was employed to implement the programmable switch 102. To demonstrate the efficacy of the accelerator-based programmable switch 102, the system 100 trained a variety of popular RL algorithms including DQN, A2C, PPO, and DDPG. Experimental results demonstrate that, compared with state-of-the-art distributed training approaches, the system 100 offers a system-level speedup of 1.72 to 3.66 times for synchronous distributed training and 1.56 to 3.71 times for asynchronous distributed training. Our evaluation also shows that the distributed RL training system 100 achieves better scalability for both synchronous and asynchronous distributed training in a rack-scale cluster.

FIG. 2 is a simplified flow diagram of distributed RL training according to an embodiment. A standard RL setting assumes an agent interacting with a given environment repeatedly over a large number of steps. At the beginning, the agent receives an initial state from the environment and then takes an action based on its policy (parameterized by a model) that maps a current state to an action from a possible action set (e.g., action←policy(state)). After the selected action takes effect in the environment, the next state will be generated and returned back to the agent along with a reward. This agent-environment interaction continues until the agent encounters a terminal state and the sequence of interactions between initial and terminal state forms an episode. Afterwards, the interaction restarts to generate a new episode.

During the generation of numerous episodes, those states, actions, and rewards are collected to form a trajectory that is then used to improve the policy by updating its model based on the computed gradient. The goal of the agent is to learn a policy that maximizes the reward objective, or an episode reward, e.g., the rewards accumulated over an episode.

In some scenarios, DNN training is time-consuming. This is also true for RL training. Different from DNN training, RL training requires a huge number of iterations, e.g., 200 million iterations to learn Atari games with DQN algorithm (see Table 1), as compared to the popular DNN ResNet, which requires only 600K iterations, and thus demanding a significant amount of training time, e.g., eight days on a single GPU for DQN training. To overcome this challenge, distributed RL training has grown in popularity recently. This RL training relies on multiple agents, namely workers, to explore the environments in parallel to earn local trajectories for model improvements, i.e., gradients. Those computed local gradients from workers can be "aggregated" (i.e., gradient aggregation) by a central node or decentralized workers to obtain fully summed gradients for updating the model of the policy. Once the policy is improved, workers get ready for the next training iteration. The workers in distributed training can run either synchronously or asynchronously. In synchronous setting, the workers are blocked during gradient aggregation (as well as weight update and transfer) in each iteration. In asynchronous setting, the workers are allowed to run independently without blocking.

Figure 3:
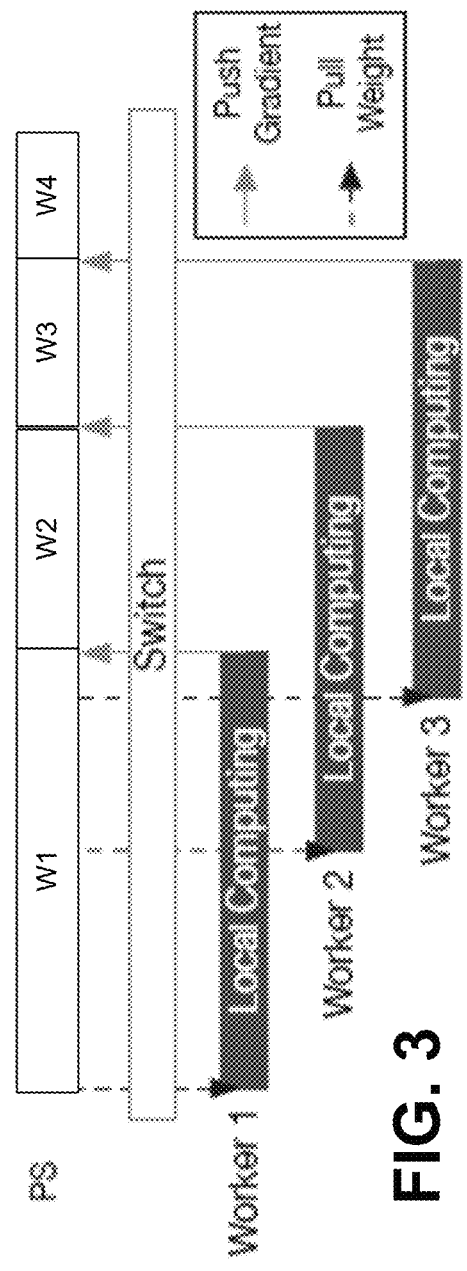
FIG. 3 is a flow diagram illustrating asynchronous distributed RL training with a centralized parameter server according to an embodiment.

FIG. 3 is a flow diagram illustrating asynchronous distributed RL training with a centralized parameter server (PS) according to an embodiment. In FIG. 3, the parameter server maintains the up-to-date weights and workers independently pull the latest weight for local computation. Once a gradient is computed locally (although staled already), the gradient is pushed to the parameter server to update the current weight. Through the centralized server, all workers, although running asynchronously, keep up to the up-to-date weight to a certain extent. Note that the asynchronous training does not apply to the AllReduce approach (see FIG. 1B), since the circular aggregation in AllReduce is a globally synchronized process.

As synchronous and asynchronous approaches offer different trade-offs, they co-exist as the two mainstream methods for distributed training. Synchronous distributed training demands synchronization among workers for gradient aggregation, and a global barrier is placed for each training iteration. Such blocking aggregation (due to synchronization requirement) stays in the critical path of the synchronous training systems and significantly affects the execution time of each iteration, especially in large-scale distributed systems.

In various embodiments, asynchronous training breaks the synchronous barrier among workers (e.g., worker computing devices) for minimal blocking overhead. However, the asynchrony suffers from the drawback of using stale gradients for model updates, which slows down training convergence, i.e., due to requiring more training iterations. By contrast, the synchronous training has no staleness issue, and thus enjoys a faster convergence, i.e., requiring minimal iterations.

Ideally, designers want to have fast gradient aggregation for both synchronous and asynchronous training, such that synchronous training will pay less blocking overhead for aggregation, and asynchronous training will obtain fresher gradient for faster convergence. The disclosed RL training system 100 and associated methods can benefit from both synchronous and asynchronous RL training.

As discussed, there are two mainstream approaches for gradient aggregation in distributed RL training: centralized parameter server based approach (PS) and decentralized AllReduce based approach (AR). These approaches are compared in FIG. 1A (PS approach) and FIG. 1B (AR approach), respectively. As noted in FIG. 1A, the local gradients in each worker are sent to the central server to perform summation, followed by the weight update. The updated weights are then sent back to all workers to overwrite their local copies, such that the next iteration can start. FIG. 1B, in contrast, illustrates the Ring-AllReduce approach, in which each worker computing device sends its local gradients to the next neighbor worker computing device to perform partial summation in a circular manner until the gradients are fully aggregated.

Afterwards, each worker computing device uses the aggregated gradients to perform updates on local weights. To facilitate this discussion, assume that there are multiple worker computing devices (or workers for short) and a central parameter server connected with a network switch. For the PS approach, each worker has to go through four network hops to complete the gradient aggregation, and the central server is the bottleneck. The AR approach avoids this central bottleneck but requires many more network hops. For the case where N worker computing devices are connected to a switch, the number of network hops for the aggregation is (4N−4), which is linear to the number of workers.

To further understand their performance characteristics, we run the synchronous distributed RL training with both PS and AR approaches in a GPU cluster connected with 10 Gb Ethernet (see the detailed experimental setup below). The training procedure may be segmented for each iteration into multiple components: local gradient computing (including agent action, environment reaction, trajectory buffer sampling, memory allocation, forward pass, backward pass, and GPU memory copy), gradient aggregation, weight update, and others. Performance overheads of these different components are quantified in FIG. 4.

Figures 4A, 4B:
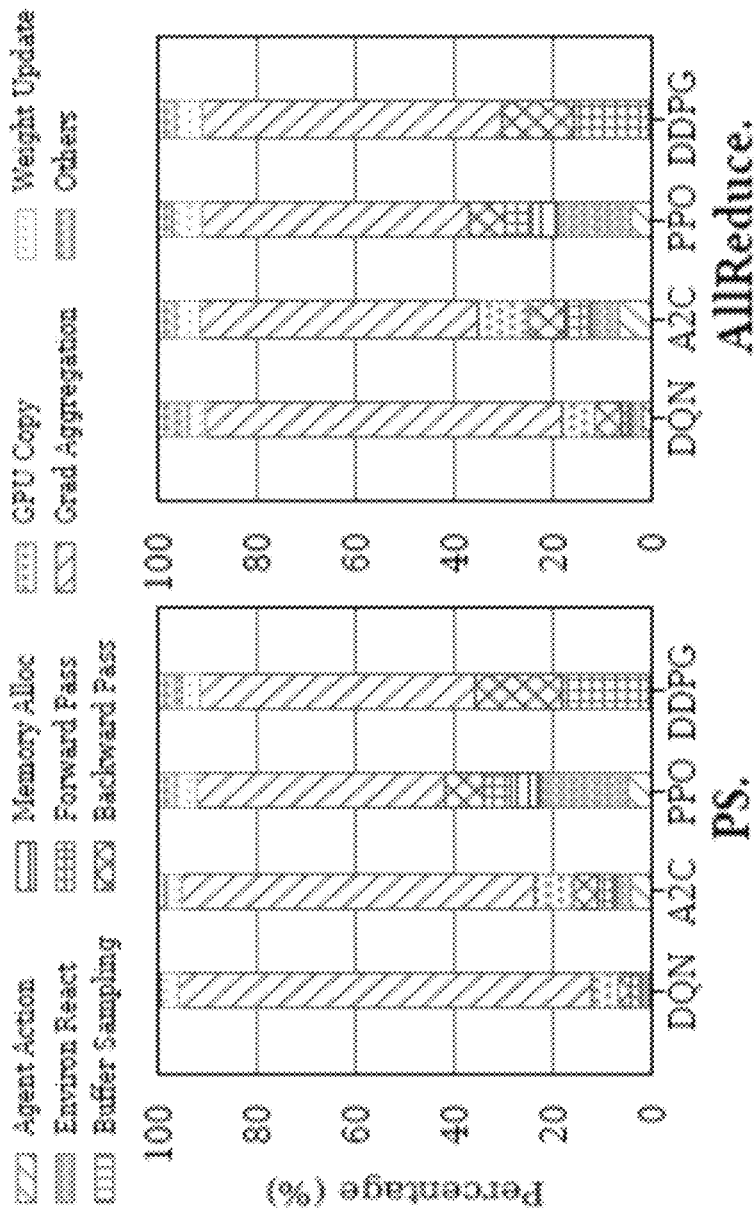
FIG. 4A is a graph illustrating a performance breakdown of each iteration in distributed RL training using a centralized parameter server approach.
FIG. 4B is a graph illustrating a performance breakdown of each iteration in distributed RL training using an AllReduce-based approach.

FIG. 4A is a graph illustrating a performance breakdown of each iteration in distributed RL training using a centralized parameter server approach. FIG. 4B is a graph illustrating a performance breakdown of each iteration in distributed RL training using an AllReduce-based approach. As can be seen, the gradient aggregation occupies a large portion (49.9% to 83.2%) of the execution time of each iteration for both PS and AR approaches. As the gradient aggregation involves only simple arithmetic operation (e.g., sum), its overhead mainly comes from the network communication.

To this end, the proposed distributed RL training system 100 involves an in-switch computing approach that exploits the computational capacity of programmable switches to reduce the gradient aggregation overhead. As illustrated in FIG. 1C, distributed RL training system 100 involves only two network hops (i.e., from worker node to switch, and from switch to worker node) to complete the gradient aggregation. The distributed RL training system 100 cuts the number of network hops by at least half, and thus offers much lower end-to-end communication time for each iteration of distributed RL training.

The distributed RL training system 100 utilizes programmable switches to pursue the in-switch computing approach for accelerating distributed RL training for three reasons. First, programmable switches are pervasive today. In modern data centers or rack-scale clusters, programmable switches have become the backbone technology that allows developers to define their own functions for network packet processing. Second, programmable switches offer the flexibility for developers to program the hardware, which simplifies the distributed RL training system 100 implementation. The programmable switch has control plane and data plane. The control plane is in charge of network management, while the data plane is responsible for data transferring (i.e., packet forwarding). The distributed RL training system 100 design may extend both the control plane and data plane without affecting the regular network functions. Third, the programmable switch inherently enables scalability. For example, the switches have been widely used to scale the cluster size in data centers. The distributed RL training system 100 may exploit the existing network architecture of a typical data center to scale distributed RL training in rack-scale clusters.

The goal of the distributed RL training system 100 is to reduce the end-to-end execution time of distributed RL training by alleviating its network communication overhead and increasing its parallelism and scalability. As discussed, exploiting programmable switches (such as the programmable switch 102) to conduct gradient aggregation brings benefits for distributed RL training. However, doing so involves some challenges. First, the programmable switch 102 was originally designed for packet forwarding. The in-switch computing, however, is to enable the point-to-point communication between the switches and worker nodes for gradient aggregation, without affecting the regular network functions. Second, the programmable switch has limited computation logic and on-chip memory for performing acceleration. Therefore, the design should be simple and efficient to meet the performance requirements. Third, as the number of worker nodes and switches is increased in a rack-scale cluster, the proposed in-switch computing should be able to scale for distributed RL training. In the following, the aforementioned challenges are respectively addressed by modified (or extended) implementation of the programmable switches 102.

To support in-switch computing for distributed RL training, distributed RL training system 100s can be built a proprietary protocol and packet format based on regular network protocols. FIG. 5A is a block diagram illustrating a format of a control packet according to various embodiments. FIG. 5B is a block diagram illustrating a format of a data packet according to various embodiments. In each of the control packet and data packet, a Type of Service (ToS) field in the internet protocol (IP) header may be employed to identify packets using this proprietary protocol.

The ToS field may be a 1-byte field (e.g., a flag) in the IP protocol header and be used to prioritize different IP flows. The packets that belong to the in-switch RL training may be tagged with reserved ToS values. To differentiate between control and data packets in the distributed RL training system 100, different ToS values may be used.

As illustrated in FIG. 5A, tagged by a reserved ToS value, the packet of a control message may have a one 1-byte mandatory Action and one optional Value payload after the User Datagram Protocol (UDP) header. In the Action field may be defined multiple unique action codes for the basic operations for distributed RL training (see Table 2).

TABLE 2

Control Message in Proprietary Protocol

| Name | Description |
| --- | --- |
| Join | Join the training job |
| Leave | Leave the training job |
| Reset | Clear accelerator buffers/counters on the switch |
| SetH | Set the aggregation threshold H on the switch |
| FBcast | Force broadcasting a partially aggregated segment on the switch |
| Help | Request a lost data packet for a worker |
| Halt | Suspend the training job on all workers |
| Ack | Confirm the success/failure of actions |

For some actions, the Value field may be used. To be specific, for Join message, the Value field can be used for the metadata regarding the training model. Also, for SetH message, the Value field may be used to specify how many gradient vectors (i.e., aggregation threshold H) need to be aggregated before broadcasting the results. By default, H may be equal to a predetermined number of the worker computing devices involved in the RL training, for example.

Similar to the control packet, the data packet (FIG. 5B) may also be tagged with a reserved ToS value. Its UDP payload may begin with an 8-byte Seg (e.g., "segment") field to indicate the indices of the transferred data packets. Each Seg (or segment) number may correspond to a special offset in the gradient vector and the gradient data from the packets with the same segment number will be aggregated. Besides the Seg field, the rest of the payload space (limited by the Ethernet frame size, e.g., typically 1,522 bytes) may be filled with the gradient data. Furthermore, for the efficiency of data processing, the gradient data may be transmitted and computed in a raw float-point format in the distributed RL training system 100.

FIG. 6 is a block diagram illustrating system architecture of an accelerator-based switch 600 according to an embodiment. The accelerator-based switch 600 may be the same or similar to the programmable switch 102 of FIG. 1C. In various embodiments, the accelerator-based switch 600 is designed with an accelerator 605 integrated within a data plane 602 of the accelerator-based switch 600 as a "bump-in-the-wire" component. In other words, in various embodiments, the accelerator 605 is coupled to an input arbiter 607 and to a control plane 622 of the system architecture, and thus function as an extended data plane of an Ethernet switch.

In various embodiments, the incoming network packets are received by an ingress portion 601 of the data plane 602, e.g., to include a Physical Layer Transceiver (PHY) and Ethernet Media Access Control (ETH MAC), and then stored in receiver (Rx) queues for further processing. In these embodiments, the input arbiter 607 is coupled to the Rx queues and elects one non-empty Rx queue from which to fetch a packet in a prioritized order, and feeds the chosen packet into a packet handling processor 612. After that, the header information of the packet is extracted, parsed, and compared with different forwarding rules in the lookup tables for destination identification. And then, the packets are dispatched to their corresponding egress transmission (Tx) queues in an egress portion 651 of the data plane 602, where the packets are finally transmitted through Ethernet MAC and PHY transceivers, as illustrated.

To enable in-switch acceleration, the functionality of the input arbiter 607 is enhanced such that the input arbiter 607 can detect and feed tagged packets to the accelerator 605 instead of the packet handling processor 612, according to their ToS fields assuming the incoming packet is associated with a gradient vector as will be explained in more detail. Further, the input arbiter 607 may treat the output of the in-switch accelerator 605 as the output from an ingress Rx queue, so that the result of gradient aggregation can be sent out, via the packet handling processor 612, to worker computing devices (worker nodes) as a regular traffic.

In some embodiments, the accelerator 605 proceeds with buffering aggregated gradient data of incoming packets until the aggregated gradient data incorporates a gradient segment from a threshold number of worker computing devices, as will be described in more detail. The accelerator 605 can further proceed with outputting, to the input arbiter 607, the aggregated gradient data as an aggregated data packet.

In various embodiments, with more particularity, the input arbiter 607 may analyze packet headers of incoming packets and determine which of the incoming packets are part of gradient vectors received from worker computing devices that are performing reinforcement learning (RL). In these embodiments, the accelerator 605 is coupled to the input arbiter 607 and receives the incoming packets from the input arbiter 607. The accelerator 605 may aggregate gradient values of the incoming packets, as the gradient values are received, to generate the aggregated data packet associated with a gradient segment of the gradient vectors. The accelerator 605 may further transfer the aggregated data packet to the input arbiter 607 to be transmitted to the worker computing devices, which are to update local weights based on the aggregated data packet.

Figure 7:
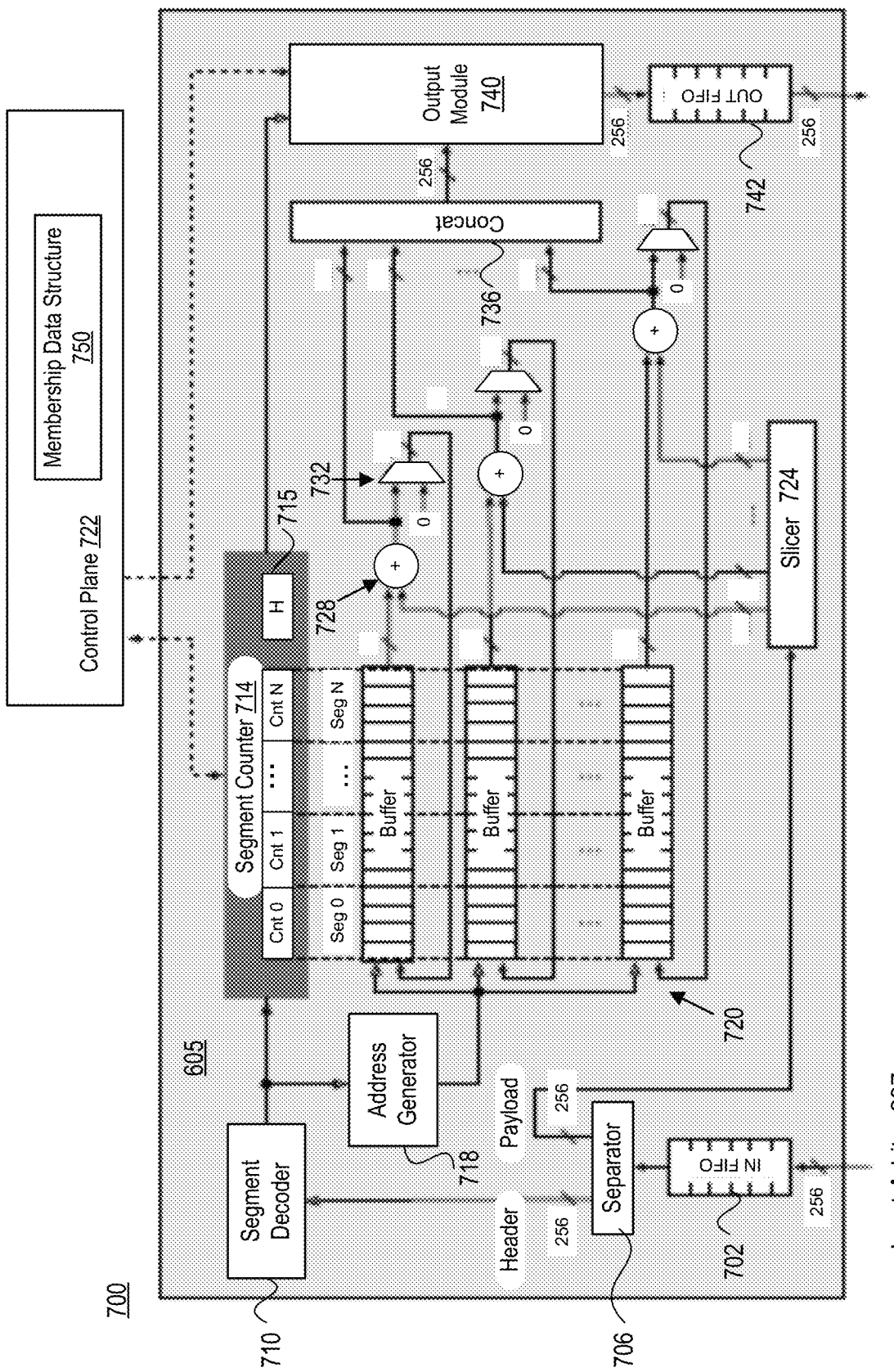
FIG. 7 is a block diagram illustrating accelerator architecture of the accelerator of FIG. 6 according to various embodiments.

FIG. 7 is a block diagram illustrating accelerator architecture 700 of the accelerator 605 of FIG. 6 according to various embodiments. To maximize the data-level parallelism, in various embodiments, the in-switch accelerator 605 processes each incoming packet at the granularity of a "burst" which refers to the data that the internal bus can deliver in a single clock cycle (e.g., 256 bits or some other particular amount of data, depending on implementation). Thus, each data packet may be divided into multiple bursts to be processed and computed.

In various embodiments, the accelerator 605 includes an input first-in-first-out (FIFO) buffer 702 in which to queue a burst of incoming data according to various embodiments. In these embodiments, the input FIFO buffer 702 is coupled to and feeds into a separator 706, which itself is coupled to and feeds a header into a segment decoder 710 and a payload (e.g., gradient data) into a slicer 724. The segment decoder 710 may be coupled to a segment counter 714 and an address generator 718, both of which may be coupled to multiple addressable buffers 720. In an embodiment, a decoding subsystem includes the input FIFO buffer 702, the separator 706, the segment decoder 710, and the slicer 724.

In corresponding embodiments, each of the multiple addressable buffers 720 may be coupled to a corresponding adder 728 and the slicer 724. Each of the adders 728 may be coupled to a multiplexer 732, which may be controlled to feed aggregated gradient data or zeros back to be written back into the respective addressable buffer 720. In an embodiment, an aggregation subsystem may include the multiple addressable buffers 720, a set of the adders 728, a number of the multiplexers 732, and the address generator 718, which is to generate addresses within the multiple addressable buffers 720.

In corresponding embodiments, outputs of the adders 728 (e.g., chunks of aggregated gradient data for the segment) are fed into a concatenator 736. In other words, the concatenator 736 is coupled to outputs of the set of adders 728. The concatenator 736 may, in turn, feed a concatenated aggregated gradient data into the output module 740 where a header 715 may be added to generate an aggregated data packet. The segment counter 714 may trigger the output module 740 to output the aggregated data packet into an output FIFO 742, which may queue the aggregated data packet for being sent back to the input arbiter 607 to be transmitted to the worker computing devices. The worker computing devices may then update local weights based on the aggregated data packet. In an embodiment, an output subsystem may include the concatenator 736, the output module 740, and the output FIFO buffer 742.

More specifically, after a burst of an incoming packet is queued into the input FIFO 702 from the input arbiter 607, the separator 706 may parse (or separate) the bursts of the incoming packet into the header and bursts of the payload. The header bursts, which may include the Ethernet, IP, UDP, and proprietary ToS protocol fields, may be fed into the segment decoder 710. The payload bursts, which may include a gradient segment of the gradient vector, may be fed into the accumulation loops of the multiple addressable buffers 720 and the corresponding adders 728. The segment decoder 710 may extract (e.g., decode) the segment number from the packet header, and pass the segment number to both the segment counter 714 and the address generator 718.

In some embodiments, the accelerator 700 can set an aggregation threshold consistent with a value within a value field of the incoming packet. In disclosed embodiments, this "aggregation threshold," or H, can be understood as the number of the working computing devices participating in the reinforcement learning (RL). In various embodiments, the segment counter 714 tracks aggregation (e.g., track progress of the aggregation status) of the gradient segments by assigning each segment an aggregation counter, illustrated as Cnt 0, Cnt 1, . . . Cnt N. This aggregation tracking may support either synchronous or asynchronous aggregation of gradient vectors received from the worker computing devices. The segment counter 714 may be incremented for each aggregated gradient data (e.g., each iteration of aggregation of the segment) until reaching the specified aggregation threshold H.

During the aggregation, the slicer 724 may slice (or partition) each payload burst into gradient data chunks of a predetermined size, e.g., into individual 32-bit (or 64-bit or the like) floating-point elements, and feed the gradient chunks into the adders 728. The adders 728 compute in parallel, and may keep summing the gradient data chunks of incoming payload bursts with accumulated aggregated gradient data retrieved from respective ones of the multiple addressable buffers 720. Thus, respective adders of the set of adders 728 are to add gradient data chunks, from the gradient segment, to the aggregated gradient data from respective ones of the multiple addressable buffers 720. To align the summation data for the same segment number and burst offset, the address generator 718 may be adopted to concurrently generate the buffer addresses associated with the segment number within the addressable buffers 720, e.g., generate the buffer addresses on the fly. The multiplexers 732 may be configured to reinsert the aggregated gradient data of the predetermined size into respective ones of the multiple addressable buffers 720 for further aggregation based on additional ones of the gradient vectors that share the segment number.

In various embodiments, the aggregating performed by the aggregation subsystem as just explain may continue, where the aggregation counter is to be incremented for the gradient segment until reaching an aggregation threshold H, e.g., that equals a number of the worker computing devices. When the aggregation counter reaches the aggregation threshold, aggregation of the gradient vectors from the workers may be considered complete for the segment. The segment counter 714 may detect that its aggregation counter has reached the aggregation threshold, in to response to which the segment counter 714 may reset the aggregation counter and trigger the multiplexers to pass zeros, which are written to the multiple addressable buffers 720 at the associated buffer address for the gradient segment. The segment counter 714 may further trigger the output module 740 to transfer the aggregated data packet, containing the concatenated aggregated gradient data and the packet header 715 for the gradient segment, to the output FIFO buffer 742. The output FIFO buffer 742 may then send or transfer the aggregated data packet to the input arbiter 607 to be transmitted to the worker computing devices, which are to update local weights based on the aggregated data packet.

FIG. 8A is a packet-based flow diagram of conventional gradient aggregation using a parameter server approach. Here, the parameter server that is performing aggregation has to has to wait for the arrival of the entire gradient vectors before the summation operations. FIG. 8B is a packet-based flow diagram of gradient aggregation using an accelerator-based switch according to disclosed embodiments. Beyond the fine-grained processing of each packet within the accelerator 605, the distributed RL training system 100 also conducts the gradient aggregation at the granularity of network packets. This differs from the conventional approach illustrated in FIG. 8A where an aggregator server has to wait for the arrival of the entire gradient vectors before the summation operations. Instead, the accelerator-based switch 600 may start the computation immediately as soon as the incoming packets with the same segment number are received. Such an on-the-fly aggregation approach hides the overhead of summation operations and data transmission, which further reduces the latency of gradient aggregation.

To support distributed training within-switch acceleration, a control plane 722 (such as the control plane 622 of FIG. 6) may also be extended to maintain a lightweight membership data structure 750 (FIG. 7) for the worker computing devices and switches involved in the current training job. As illustrated in Table 3, the membership data structure 750 records the identifier (ID) number (a unique number for each membership entry), IP address, UDP port number, type, and the corresponding parent ID in the network typology for every involved worker/switch.

TABLE 3

| Control Plan Membership Data Structure/Table | | | | |
|---|---|---|---|---|
| ID | IP | Port | Type | Parent |
| 0 | 10.0.0.2 | 9999 | Worker | 4 |
| 1 | 10.0.0.4 | 9998 | Worker | 4 |

TABLE 3-continued

| Control Plan Membership Data Structure/Table | | | | |
|---|---|---|---|---|
| ID | IP | Port | Type | Parent |
| ... | ... | ... | ... | ... |
| 4 | 10.0.0.10 | 9990 | Switch | — |

The entries in membership data structure 750 can be updated with the control messages, such as Join and Leave messages illustrated in Table 2. This information can be used by the data plane 602 for data collection, computation, forwarding, and broadcast. Accordingly, the membership data structure 750 is to track, with individual entries, an identity, an entity type, and a network location of respective ones of the worker computing devices and multiple of the programmable switches involved in the RL. The membership data structure 750 is also usable to determine forwarding and broadcasting of the aggregated data packet.

Besides maintaining a membership data structure 750, the control plane 722 may also manage the in-switch accelerator for its initialization, configuration, as well as resetting. This can be fulfilled through the control messages such as Reset and SetH in Table 2. The control plane may also help handle lost packets, although it is uncommon in the cluster environment, with minimal overhead. Specifically, the majority of tasks of handling lossy packets can be offloaded to worker computing devices, and simple tasks such as accepting/forwarding control message (e.g., FBcast and Help) may be left to the programmable switch 102 or 600.

FIG. 9 is a simplified block diagram illustrating a typical network architecture at rack scale according to an embodiment, as the in-switch computing may be scaled to rack-scale or data center level. In some embodiments, the servers in the same rack are connected by a Top-of-Rack switch (ToR) with 10 Gb Ethernet. In the higher level, there are Aggregate switches (AGG) and Core switches (Core) connected with higher network bandwidth (e.g., 40 Gb to 100 Gb).

To scale out distributed RL training with distributed RL training system 100 in the rack-scale Cluster, a "hierarchical aggregation" approach may be employed. Specifically, if a switch finishes its local aggregation for a certain segment in the gradient vector stored in the programmable buffers 720, the switch may forward the aggregated segment to the switches in the higher level for global aggregation. If there are more than one switch in the higher level, the switch (that is finishing local aggregation) may select the switch with the smallest value of IP addresses, so that the gradient data can finally be aggregated in the core switch. Then the globally aggregated gradient data may be broadcasted to the lower-level switches for further distribution. Such a design leverages the existing rack-scale network architecture and does not introduce additional hardware or network topology changes.

The distributed RL training system 100 was implemented with a real-world NetFPGA-SUME board solely for experimentation and validation purposes. NetFPGA-SUME has an x8 Gen3 PCIe adapter card incorporating Xilinx Virtex-7 FPGA and four 10 Gbp Ethernet ports. We use the reference switch design provided by NetFPGA community for further development. To fully utilize the bit-width of its internal AXI4-Stream bus (i.e., 256 bits/cycle), we employ eight 32-bit floating-point adders for parallel gradient aggregation. Our in-switch accelerator is integrated into this reference switch design and interacts with other components using standard 256-bit AXI4-Stream bus at the frequency of 200 MHz. In terms of the on-chip resource utilization, the accelerator 105 or 605 consumes extra 18.6% of Lookup Table (LUT), 17.3% of Flip-Flop (FF), 44.5% of Block RAM (BRAM), and 17 DSP slices, compared with the unmodified reference design. Note that the implementation of distributed RL training system 100 hardware and network protocols are general to both synchronous and asynchronous distributed training.

Here we discuss how to exploit the in-switch computing paradigm to facilitate our hardware/algorithm co-design, and further improve the performance of both synchronous and asynchronous distributed RL training. As discussed previously, for synchronous training, we can directly apply the distributed RL training system 100 to reduce the end-to-end execution time of gradient aggregation by replacing the aggregation operation, such as the AllReduce operation, with our in-switch aggregation. For asynchronous training, the distributed RL training system 100 offers new optimization space to improve the training parallelism with the in-switch computing paradigm, which demonstrates a useful case of implications of the distributed RL training system 100 on distributed RL training.

A conventional approach for asynchronous distributed training (see FIG. 3) relies on a central parameter server to maintain the up-to-date weights, where each worker interacts with the server to keep up with the latest weights such that the training can converge. To gain the benefits from the distributed RL training system 100, a straightforward approach is to shift the functions of parameter server to the network switch. However, this will significantly increase the hardware cost, because the tasks running on parameter servers demand not only intensive computation resource, but also large memory space for storing weights and historical updates. With the in-switch aggregation, the asynchronous distributed training is revised and proposed are two optimization techniques to further decentralize the training and increase its parallelism.

A first optimization technique includes decentralized weight storage. Instead of pushing gradients to the central server, the accelerator-based switch may aggregate gradients from asynchronous workers and then broadcast the summed gradients to each worker for weight update in every iteration. Since the same model weights are initialized among all workers, and also broadcast the same aggregated gradients, the decentralized storage of weights are always agreed over iterations in spite of asynchronous training.

Figure 10:
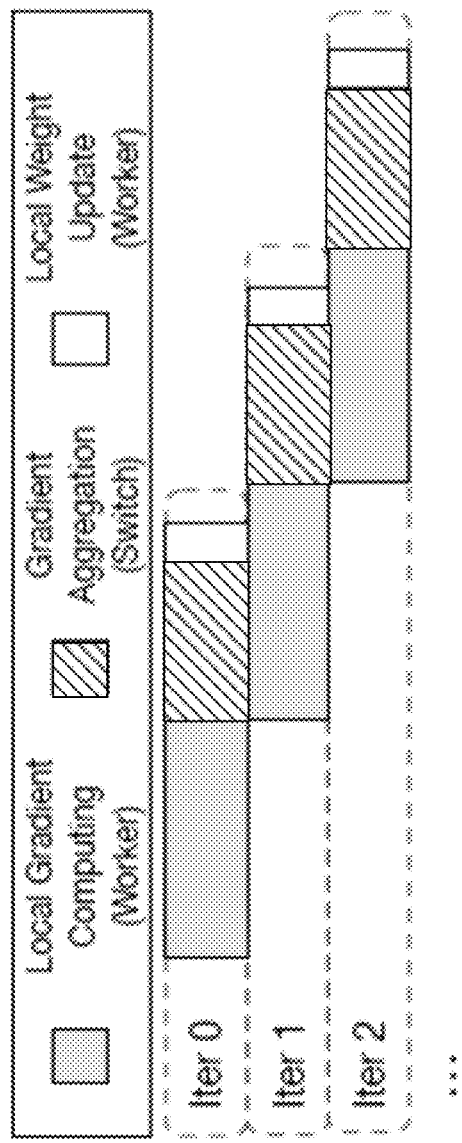
FIG. 10 a simplified flow diagram illustrating a three-stage pipeline in an optimized asynchronous distributed DL training according to an embodiment.

A second optimization technique includes a three-stage pipeline. FIG. 10 a simplified flow diagram illustrating a three-stage pipeline in an optimized asynchronous distributed DL training according to an embodiment. The three stages of the pipeline may be decoupled within a training iteration, which includes: (1) Local Gradient Computing (LGC), (2) Gradient Aggregation (GA), and (3) Local Weight Update (LWU). (See also FIG. 17.) The first stage may take place on the worker computing devices, which performs environment interactions, trajectory collection, and gradient generation with uploading. The second stage may take place within the accelerator-based switch, which conducts the gradient gathering, summing, and broadcasting. The third stage may take place once again on the worker computing devices for weight updates.

For the three stages in a training iteration, we can pipeline them to increase the parallelism of distributed training, as illustrated in FIG. 10. At the LGC stage, each worker runs independently without synchronizing with other workers or the switch, and keeps uploading computed gradients to the switch. At the GA stage, the switch aggregates gradients in an asynchronous manner, and keeps aggregating the incoming gradients. Once sufficient gradient vectors are received, the aggregated gradients are broadcasted back to workers, so that the LWU stage can start. Such an approach encourages faster workers to contribute more to the aggregation, while slower workers commit less without blocking the training.

Inevitably, due to the asynchrony, staleness of weights and gradients could occur, which would slow down the training convergence. A bound to the staleness of the gradient may be explicitly provided. Specifically, the system 100 may check the staleness of local gradient on each worker and commit only lightly staled gradients within a bound to the switch. FIG. 11 illustrates sets of psuedocode for Algorithm 1, asynchronous distributed training algorithm with in-switch acceleration according to various embodiments. The three stages are described in psuedocode in Algorithm 1, starting with the GA stage within the switch, followed by the LWU thread of each worker, and then by the LGC thread of each worker, the latter of which would actually be performed first to determine the local gradients to be sent in gradient vectors to the switch. Note that the worker computing devices would be updated to add an appropriate tag to the ToS field of network packets to signal to the accelerator-based switch when the network packets include gradient data for aggregation by the accelerator.

In various embodiments, for the GA stage, the aggregation is performed at the gradient segment level, but Algorithm 1 (of FIG. 11) highlights that the aggregating is performed while H gradient vectors are still being received. Once all of the threshold number H of gradient vectors have been processed, the gradient segments ($g_{sum}$) may be broadcast back to the workers. We prove the convergence of our proposed asynchronous training with both empirical evaluations and theoretical derivations as below.

To prove the convergence of asynchronous switch-based aggregation, we convert it into the classical parameter-server based asynchronous training. By showing that the former is mathematically equivalent to the latter, we reach the same conclusion as in other works, but constants change. See Qirong Ho, James Cipar, Henggang Cui, Seunghak Lee, Jin Kyu Kim, Phillip B Gibbons, Garth A Gibson, Greg Ganger, and Eric P Xing. 2013, "More Effective Distributed ML via A Stale Synchronous Parallel Parameter Server," *Proceedings of the 26th International Conference on Neural Information Processing Systems* (*NIPS* '13); and J. Langford, A. J. Smola, and M. Zinkevich. 2009, "Slow Learners are Fast," *Proceedings of the 22nd International Conference on Neural Information Processing Systems* (*NIPS* '09), Vancouver, Canada.

To be specific, we assume there is a virtual parameter server in our asynchronous switch aggregation (see Algorithm 1), which stores the up-to-date weights and also performs weight updates as in the classical design. Such a parameter server is equivalent to the LWU thread on each worker node. As discussed, the workers perform identical weight updates over iterations, and thus the decentralized agreed weights can be regarded as being stored on a single centralized server. Consequently, gradient pushing, aggregation, and broadcasting can be reduced to the upstream communication to the parameter server, while weight copying in the LGC thread on each worker node can be reduced to the downstream communication from the parameter server. Further, the workers run in parallel asynchronously to push gradients (through the switch) to the parameter server to perform updates, and then the updated weights will be used in a new iteration. The minor difference between our approach and that of the prior work (referenced above) lies in the aggregation of gradient vectors. This can be reduced to the usage of a larger batch-size for training, which does not change the convergence rate. Therefore, our proposed asynchronous training can be reduced to the conventional approaches for purposes of comparison, and offers a convergence rate of $O(T^{0.5})$ for convex objectives via stochastic gradient descent, where T is the number of training iterations.

To evaluate the training performance of the distributed RL training system 100, we use the four previously mentioned popular RL algorithms as our benchmarks. Based on their single-node training code, we develop three reference designs for each benchmark by following the state-of-the-art distributed training approaches: synchronous and asynchronous parameter-server based training (Sync/Async PS), and AllReduce based training (AR). Our reference designs are highly optimized, and show around 10% better performance with higher training rewards than the OpenAI-Baseline with MPI (a popular baseline used in the community. We list these RL algorithms as follows:
  a. DQN is one of the most popular RL algorithms for arcade game playing. Its model size is 6.4 MB when applied to the task of playing Atari game set, from which we choose the classical game, "Pong."
  b. A2C is another popular RL algorithm for game playing. Its model size is 3.3 MB when applied to the Atari game set, from which we choose a different yet classical game "Qbert."
  c. PPO is a more recent algorithm mainly for simulated robotic locomotion. Its model size is 40 KB when applied to the robotic control in simulation environment set MujoCo, from which we choose a classical environment, "Hopper.".
  d. DDPG is yet another algorithm for continuous control. The dual model size of DDPG is 157.5 KB in total when applied to the task of robotic control in MujoCo, from which we choose another classical environment, "HalfCheetah."

We implement reference designs using the state-of-the-art libraries: PyTorch 1.0, CUDA9.2, CuDNN 7.2.1, GYM, and OpenMPI 3.1.4. For iSwitch design, we use the same code and libraries from the reference design but with a different gradient aggregation method, e.g., in-switch aggregation, as well as a dual-thread training in asynchronous distributed training (see Algorithm 1).

We use multiple training approaches for each benchmark: synchronous parameter server (PS), AllReduce (AR), iSwitch (iSW), where iSwitch is the present accelerator-based switch design, as well as asynchronous parameter server (Async PS), iSwitch (Async iSW). We evaluate all approaches using the following metrics:
  a. Final Average Reward: the episode reward averaged over the last 10 episodes, which is a standard metric used in the RL training evaluation.
  b. Number of Iterations: the number of training iterations required to complete the end-to-end training. For synchronous training approaches, it can be measured at any of worker nodes. For asynchronous training approaches, it can be measured precisely at the parameter server of PS or the LWU thread of iSW by counting the number of weight updates.
  c. Per-Iteration Time: the average time interval between two consecutive iterations. For synchronous approaches, it is the latency of one training iteration. For asynchronous approaches, it can be measured precisely by the time interval between two consecutive weight-update operations at the parameter server of PS or the LWU thread of iSW
  d. End-to-End Training Time: the total training time required to achieve the same level of "Final Average Reward" for each bench-mark with different approaches.

To measure the training performance in actual wall-clock time, we setup a main cluster consisting of four nodes for purposes of experimentation and validation only. Each node has aNVIDIA Titan RTX GPU and an Intel Xeon CPU E5-2687 W@3 GHz. We use this four-node cluster for evaluating AR and iSW approaches. To also support the PS approach, we use an additional node as the parameter server. All nodes are connected to aNetgear 10 Gb Ethernet switch via Intel X540T2 10 Gb Ethernet NICs. Consider the small size of transferred gradients of RL models, e.g., 40 KB for PPO, we do not consider supporting larger network connections (i.e., 40~100 Gbps) in our experiments. As for iSW approach, we replace the network switch with a NetFPGA-SUME board, and fully use the four Ethernet ports on the NetFPGASUME board to connect the worker nodes.

For the scalability experiments, we emulate the training performance of all the approaches with more worker nodes in a cluster consisting of two-layer regular switches as in FIG. 9. Specifically, the cluster has a root switch connecting to multiple "racks" and each rack contains three worker nodes (due to the port limitation of NetFPGA boards). We emulate the hierarchical aggregation of iSwitch in the cluster. We develop the emulation with three goals: the emulated aggregation is to have (1) the exact number of network hops, (2) the same amount of traffic in the network links as possible, and (3) accurate accelerator overhead. We achieve these goals by transferring synthetic gradient data from each worker node to its third next neighbor worker node, such that each gradient message always traverses through the hierarchy of switches. After that, a barrier is set among workers to capture the slowest gradient transfer such that the aggregation can be deemed as completed. This emulation approach matches the real aggregation for (1) and (2), although with minor amplification on the network traffic between switches.

TABLE 4

| System-Level Speedup in End-to-End Training Time | | DQN | A2C | PPO | DDPG |
|---|---|---|---|---|---|
| Sync | PS | 1.00× | 1.00× | 1.00× | 1.00× |
|  | AR | 1.97× | 1.62× | 0.91× | 0.90× |
|  | ISW | 3.66× | 2.55× | 1.72× | 1.83× |
| Async | PS | 1.00× | 1.00× | 1.00× | 1.00× |
|  | ISW | 3.71× | 3.14× | 1.92× | 1.56× |

Table 4 is a summary of performance speedups in "End-to-End Training Time" for different training approaches. Speedups are based on the baseline PS for each benchmark. To achieve the goal (3), we measure the hardware accelerator overhead and add it to the aggregation time. For emulation of the local computation, we use the same trace from the PS/AR approaches, and apply it to the iSwitch for fair comparison. Besides, we also obtain the "Number of Iterations" required for iSwitch. For synchronous training, iSwitch shares the same number of iterations as PS/AR, due to their mathematical equivalence in distributed training (see Table 5). For asynchronous training, the iterations required by iSwitch can be emulated by controlling the usage of staled gradient in synchronous training approach, where the staleness of iSwitch can be calculated by the measured time ratio of the three stages (see FIG. 10) in each training iteration. Thus, we believe the emulation platform can reflect the scalability of a real-world rack-scale cluster with in-switching computing enabled.

We evaluate the training performance of the four benchmarks using the main cluster. We measure the "End-to-End Training Time," and summarize the performance speedups in Table 4. In synchronous training setting, the iSwitch approach (iSW) prevails with a great margin compared to other approaches, and offers a performance speedup of 1.72-3.66×, compared with the baseline design (PS). Although AR approach also provides improvement on DQN and A2C, the performances on PPO and DDPG are actually slightly worse than the PS. As for the asynchronous training setting, the advantage of iSwitch still holds, and offers a performance speedup of 1.56-3.71× compared to the baseline PS. Note that we evaluate the performance of synchronous and asynchronous distributed training approaches separately, as the main objective of this work is to accelerate and to support both types of approaches, instead of comparing them, as discussed previously.

immediately once packets of the same index arrive (see FIG. 8B), which reduces the synchronization overhead caused by gradient aggregation. Third, iSwitch offers balanced communication by assigning a dedicated network link to each of worker node, which removes the bottleneck caused by the central link in PS design.

Figure 12:
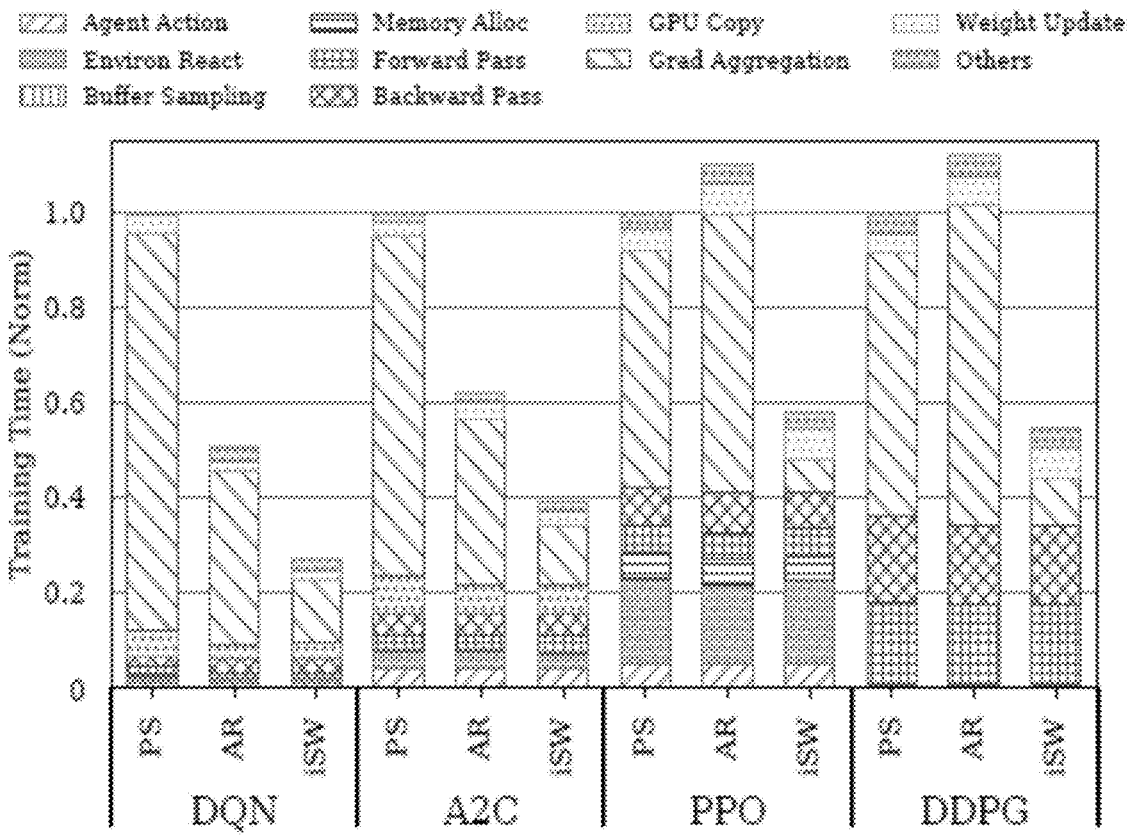
FIG. 12 is a graph illustrating a comparison of "per-iteration time" among different synchronous distributed training approaches along with a detailed breakdown, according to various embodiments.

In addition to the comparison with the baseline design (PS), we also compare iSwitch with another mainstream approach: AllReduce based training (AR), which offers balanced communication. The result in FIG. 12 shows that iSwitch still outperforms AR over all four benchmarks, i.e., 36.7%-48.9% reduction in "Per-Iteration Time" These improvements are still attributed to the accelerated gradient aggregation of iSwitch, i.e., 63.4%-87.9% reduction in aggregation time for iSW, in comparison with AR. As discussed previously, there is a performance trade-off between PS and AR. The AR approach suffers from more network hops than PS, but it removes the bottleneck caused by the central parameter server.

TABLE 5

Performance comparison of different synchronous distributed training approaches.

| | DQN | | | A2C | | | PPO | | | DDPG | | |
|---|---|---|---|---|---|---|---|---|---|---|---|---|
| | PS | AR | iSW | PS | AR | iSW | PS | AR | iSW | PS | AR | iSW |
| Number of Iterations | 1.40E+06 | | | 2.00E+05 | | | 8.00E+04 | | | 7.50E+05 | | |
| End-to-End Training Time (hrs) | 31.72 | 16.08 | 8.66 | 2.87 | 1.78 | 1.12 | 0.39 | 0.42 | 0.22 | 8.07 | 90.1 | 4.40 |
| Final Average Reward | 20.00 | 19.94 | 20.00 | 13891.73 | 13478.39 | 13489.22 | 3090.24 | 3093.18 | 3091.63 | 2476.75 | 2687.43 | 2479.62 |

TABLE 6

Performance comparison of different asynchronous distributed training approaches.

| | DQN | | A2C | | PPO | | DDPG | |
|---|---|---|---|---|---|---|---|---|
| | Async PS | Async iSW | Async PS | Async iSW | Async PS | Async iSW | Async PS | Async iSW |
| Number of Iterations | 6.30E+06 | 3.50E+06 | 1.20E+06 | 4.00E+05 | 5.40E+05 | 1.20E+05 | 3.90E+06 | 1.50E+06 |
| Per-Iteration Time (milli-secs) | 24.88 | 12.07 | 12.13 | 12.53 | 3.40 | 7.99 | 11.58 | 14.89 |
| End-to-End Training Time (hrs) | 43.54 | 11.74 | 4.38 | 1.39 | 0.51 | 0.27 | 9.65 | 6.20 |
| Final Average Reward | 19.10 | 19.82 | 13402.83 | 13505.46 | 3083.67 | 3084.83 | 2421.89 | 8485.35 |

To understand the performance improvement resulting from iSwitch under synchronous training setting, we compare the "Per-Iteration Time" of iSwitch with the PS and AR over four benchmarks in FIG. 12. We also provide detailed timing breakdown of the "Per-Iteration Time" for different approaches. This result shows that compared with the PS, iSW offers 41.9%-72.7% shorter "Per-Iteration Time" because of the 81.6%-85.8% reduction in gradient aggregation time for the four benchmarks.

The iSwitch approach provides substantial acceleration in gradient aggregation for three reasons. First, the aggregation process in iSwitch requires only half number of network hops (two hops) compared with the PS design (four hops), which achieves halved end-to-end communication latency.

Second, iSwitch possesses the unique feature of aggregation on-the-fly (as shown in FIG. 8B), which reduces the aggregation granularity from the gradient vector size, i.e., the model size in baseline design, to the network packet size. Instead of waiting for the arrival of all gradient vectors before starting computation, iSwitch conducts aggregation Meanwhile, the benchmarks demand different communication/computation loads due to their model sizes. As a result, compared with PS, AR performs better for DQN and A2C but worse for PPO and DDPG. iSwitch runs faster than both PS and AR because of the reduced end-to-end network latency as well as the on-the-fly aggregation.

Furthermore, we show the detailed results including the number of iterations, absolute training time, and achieved training rewards, in Table 5. We observe that all synchronous approaches train the same "Number of Iterations" to reach the same level "Final Average Rewards" for each benchmark.

Figure 13:
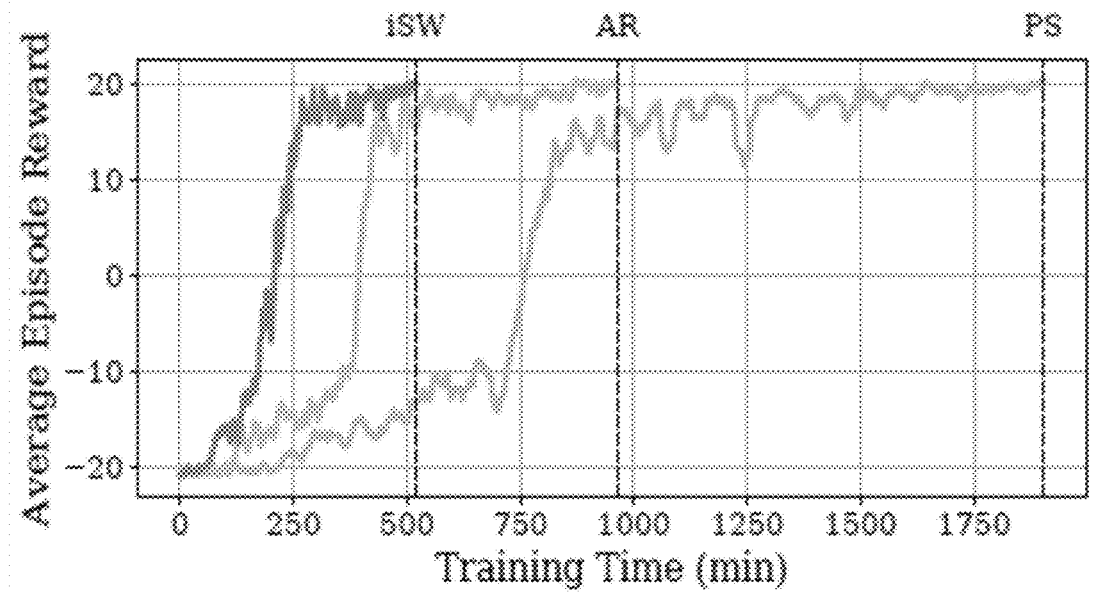
FIG. 13 is a graph illustrating a comparison of training curves of Deep-Q Network (DQN) using different synchronous approaches, according to various embodiments.

To demonstrate the synergy of acceleration and training rewards of all synchronous approaches, we evaluate the actual training curves in wall-clock time for all benchmarks, and demonstrate a case study of DQN in FIG. 13.

We now compare iSwitch with the asynchronous baseline (Async PS) for all benchmarks. To show a fair comparison, we gives the same staleness bound (S=3) for both approaches, although the conventional Async PS approach does not involve staleness control mechanisms, such that the staleness of gradient ranges from 0 to 3 iterations. We summarize the training performance of the two approaches in Table 6.

We observe that iSwitch (Async iSW) offers faster convergence, i.e., 44.4%-77.8% reduction in the "Number of Iterations," compared with the baseline (Async PS). This is due to the smaller staleness of gradient on average in iSwitch, although both approaches are bounded by the same maximal staleness. The alleviated staleness of gradients can be attributed to the advantage of accelerated gradient aggregation in iSwitch, because the faster gradient aggregation results in earlier/in-time weight update, and thus offers fresher weight and gradient for next iteration. On the other hand, Async PS suffers from doubled end-to-end communication latency, as well as the burdened central network link, and thus increases the gradient/weight communication time. As a result, the staleness of gradient becomes larger, causing an increased number of training iterations.

From Table 6, we also observe that iSwitch demonstrates 4.6%-51.5% shorter "Per-Iteration Time" for DQN and A2C, compared with the baseline. This is because asynchronous iSwitch not only enjoys the benefit of acceleration on gradient aggregation, but also employs the pipelined training to hide part of the execution time (see FIG. 10), especially the accelerated gradient aggregation and weight update. By contrast, the Async PS still pays for the long communication latency, thus increasing the time interval between two consecutive weight updates, i.e., larger "Per-Iteration Time."

Note that for PPO and DDPG, iSwitch does not show improvement in "Per-Iteration Time." This is mainly due to the relatively smaller ratios of gradient aggregation time in PPO and DDPG. Therefore, even with the pipelined aggregation, the hidden time of gradient aggregation only offers a slight reduction in "Per-Iteration Time," the limited benefit of which does not outperform the Async PS. However, the accelerated gradient aggregation of iSwitch reduces the staleness of gradients, and reduces the number of training iterations.

Figure 14:
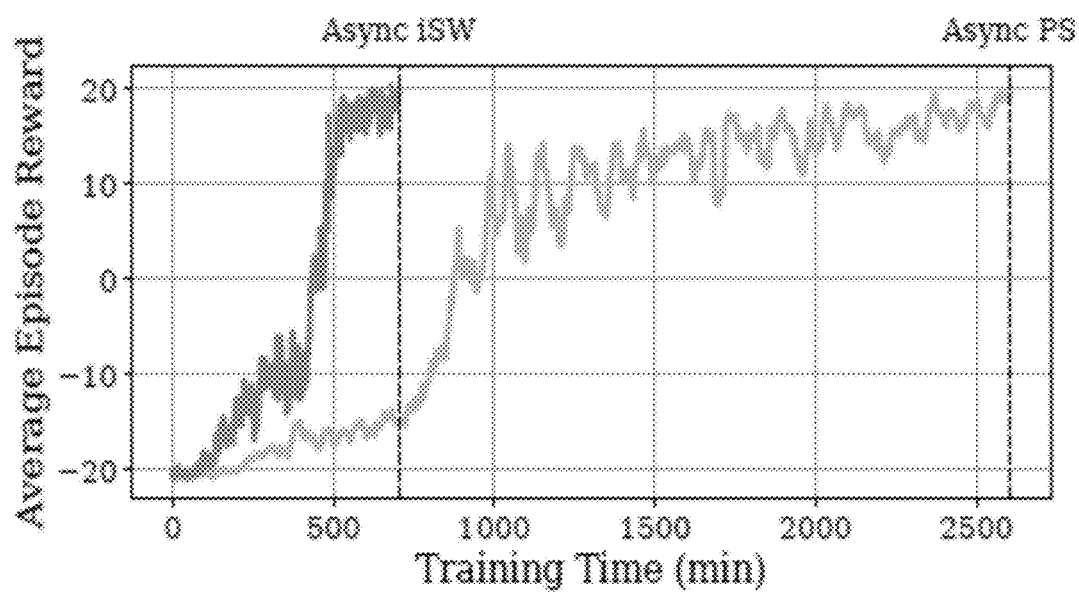
FIG. 14 is a graph illustrating a comparison of training curves of DQN using different asynchronous approaches, according to various embodiments.

To combine the effectiveness of iSwitch approach in both reduced "Number of Iterations" and improved "Per-iteration Time," we show the "End-to-End Training Time" in Table 6. Asynchronous iSwitch offers 35.7%-73.0% reduction in "End-to-End Training Time," compared with the baseline Async PS. Moreover, to demonstrate the synergy of acceleration and training rewards of both asynchronous approaches, we evaluate the actual training curves in wall-clock time for all benchmarks, and demonstrate the an example of DQN in FIG. 14.

Figure 15A:
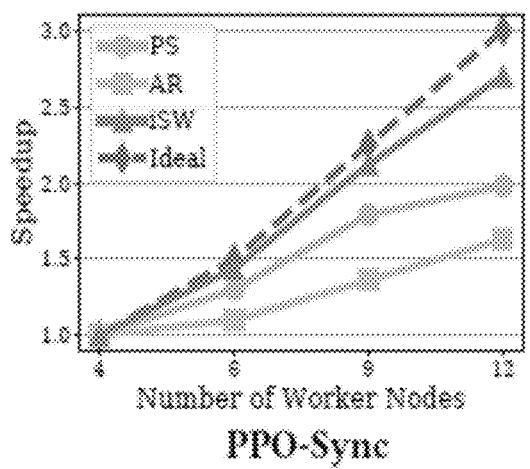
FIGS. 15A, 15B, 15C, 15D are graphs illustrating scalability comparison of some training approaches according to various embodiments.
Figure 15B:
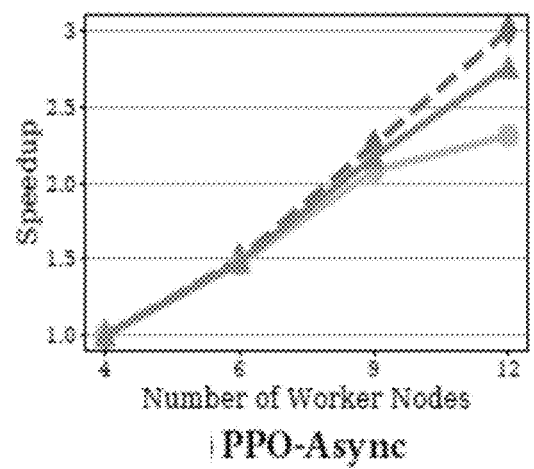
Figure 15C:
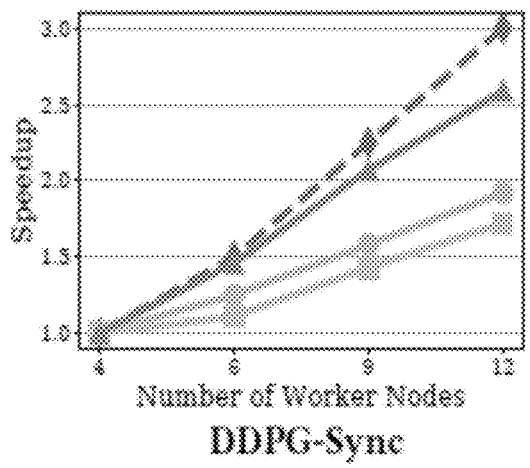
Figure 15D:
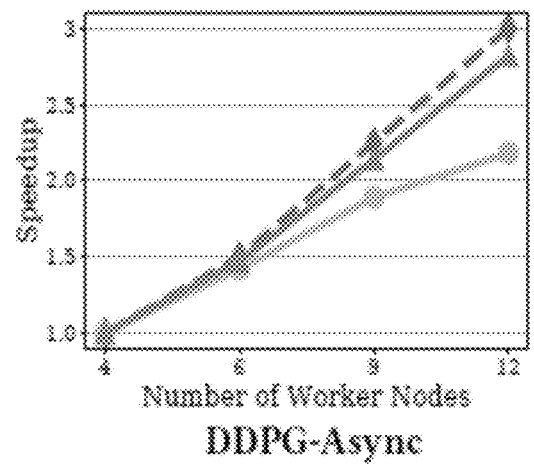

To evaluate the scalability, we measure and compare the speedups of the end-to-end training for all the training approaches, following the scalability experiment setup in described previously. We show the case study on the scalability of training PPO and DDPG with 4, 6, 9, and 12 worker nodes in FIGS. 15A-15D. For synchronous distributed training, as shown in FIG. 15A and FIG. 15C, we observe that the AR approach offers the worst speedups as the cluster scales. This is because its number of network hops for gradient aggregation is linear in cluster size, as discussed previously. The PS approach shows the second best scalability. However, it suffers from the central bottleneck in both communication and computation, and this drawback worsens as we increase the number of worker nodes. iSwitch outperforms both AR and PS with a great margin because of three major reasons: (1) the minimal number of network hops required, (2) balanced and reduced traffic load in hierarchical aggregation, and (3) the in-switch accelerator of iSwitch.

For asynchronous distributed training (see FIG. 15B and FIG. 15D), we observe that asynchronous PS approach cannot outperform asynchronous iSwitch approach, since Async PS still requires more network hops, although the asynchronous mechanism alleviates the central bottleneck to some extent. By contrast, Async iSwitch holds the best scalability (i.e., almost linear speedups), since it enjoys not only the aforementioned advantages enabled by in-switch computing, but also the benefit of three-stage pipeline as well as the alleviated staleness from the accelerated aggregation.

FIG. 16 is a flow chart of a method for accelerating distributed reinforcement learning with in-switch computing according to an embodiment. The method 1600 may be performed by processing logic that may comprise hardware (e.g., circuitry, dedicated logic, programmable logic, microcode, etc.), firmware, or a combination thereof. In one embodiment, the method 1600 is performed by the programmable switch 102 (FIG. 1C) or the accelerator-based switch 600 (FIGS. 6-7). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 16, at operation 1610, the processing logic (e.g., the input arbiter) analyzes packet headers of incoming packets of a programmable switch to determine which of the incoming packets are part of gradient vectors received from worker computing devices that are performing reinforcement learning. This step may be performed by inspecting the ToS field of the packet header to determine how the packet is tagged, e.g., as a regular network packet or as a gradient network packet.

At operation 1620, the processing logic (e.g., the input arbiter) transfers the incoming packets to an accelerator coupled to the input arbiter. For example, the accelerator may be the accelerator 605 illustrated in FIG. 6.

At operation 1630, the processing logic (e.g., the accelerator 605) aggregates gradient values of the incoming packets, as the gradient values are received, to generate an aggregated data packet associated with a gradient segment of the gradient vectors. A detailed explanation of the aggregation of the gradient values was provided with reference to the accelerator 605 of FIGS. 6-7.

At operation 1640, the processing logic (e.g., the accelerator 605) transfers the aggregated data packet to the input arbiter. At operation 1650, the processing logic (e.g., the input arbiter) transfers the aggregated data packet to a packet handling processor of the programmable switch to be transmitted to the worker computing devices, which are to update local weights based on the aggregated data packet.

Figure 17:
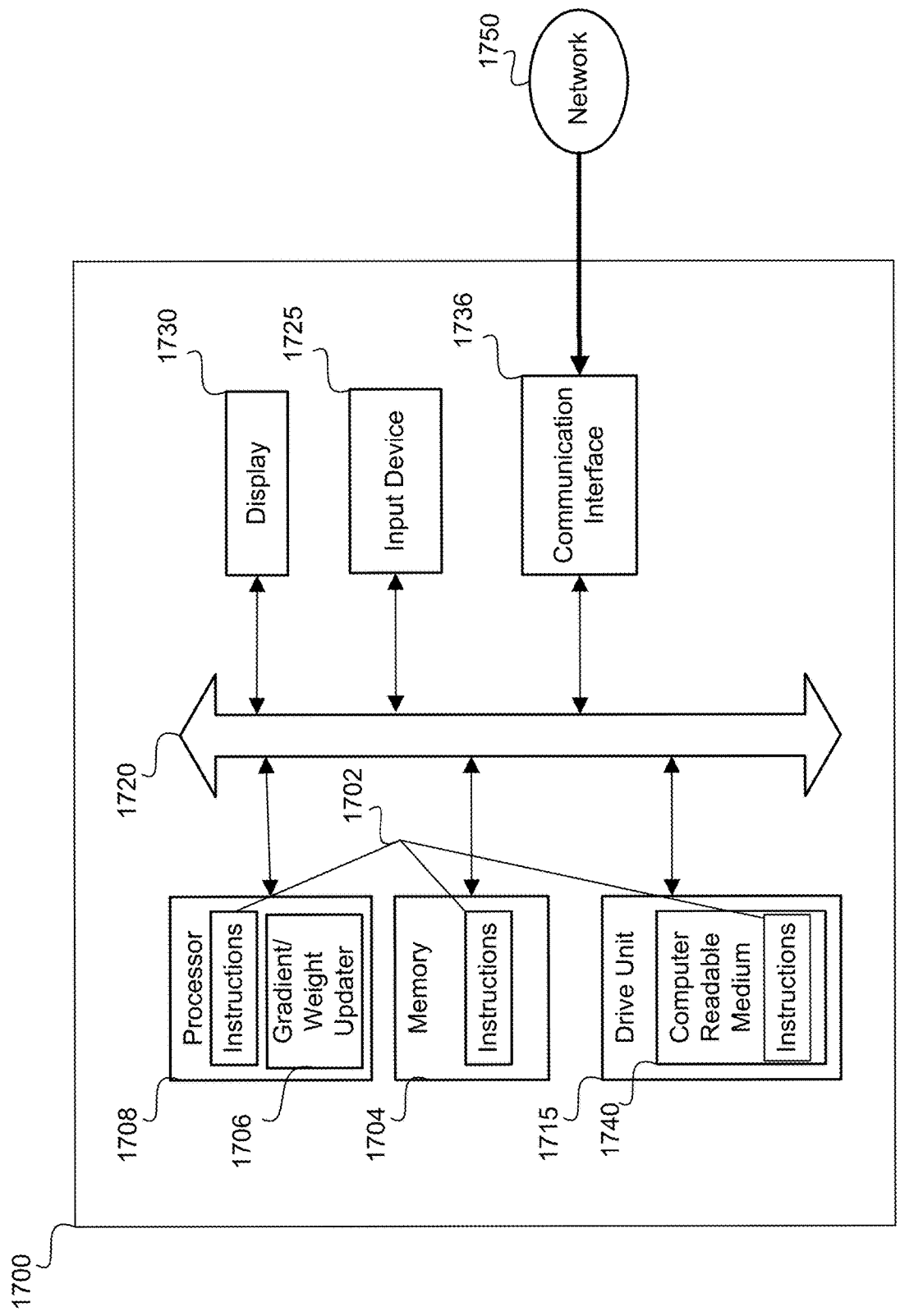
FIG. 17 is a block diagram of an example computer system in which embodiments of the present disclosure can operate.

FIG. 17 illustrates a general computer system 1700, which may represent the worker (or agent) computing devices 110 (FIG. 1C) or another device or system to which is referred or which is capable of executing the embodiment as disclosed herein. The computer system 1700 may include an ordered listing of a set of instructions 1702 that may be executed to cause the computer system 1700 to perform any one or more of the methods or computer-based functions disclosed herein. The computer system 1700 may operate as a stand-alone device or may be connected to other computer systems or peripheral devices, e.g., by using a network 1750.

In a networked deployment, the computer system 1700 may operate in the capacity of a server or as a client-user computer in a server-client user network environment, or as a peer computer system in a peer-to-peer (or distributed) network environment. The computer system 1700 may also be implemented as or incorporated into various devices, such as a personal computer or a mobile computing device capable of executing a set of instructions 1702 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 1700 may include a memory 1704 on a bus 1720 for communicating information. Code operable to cause the computer system to perform any of the acts or operations described herein may be stored in the memory 1704. The memory 1704 may be a random-access memory, read-only memory, programmable memory, hard disk drive or other type of volatile or non-volatile memory or storage device.

The computer system 1700 may include a processor 1708, such as a central processing unit (CPU) and/or a graphics processing unit (GPU). The processor 1708 may include one or more general processors, digital signal processors, application specific integrated circuits, field programmable gate arrays, digital circuits, optical circuits, analog circuits, combinations thereof, or other now known or later-developed devices for analyzing and processing data. The processor 1708 may implement the set of instructions 1702 or other software program, such as manually-programmed or computer-generated code for implementing logical functions. The logical function or system element described may, among other functions, process and/or convert an analog data source such as an analog electrical, audio, or video signal, or a combination thereof, to a digital data source for audio-visual purposes or other digital processing purposes such as for compatibility for computer processing.

The processor 1708 may include a gradient and weight updater 1706 or contain instructions for execution by a worker computing device provided a part from the processor 1708. The gradient and weight updater 1706 may include logic for executing the instructions to perform the local weight update (LWU) and the local gradient computing (LGC) as discussed in the present disclosure.

The computer system 1700 may also include a disk (or optical) drive unit 1715. The disk drive unit 1715 may include a non-transitory computer-readable medium 1740 in which one or more sets of instructions 1702, e.g., software, can be embedded. Further, the instructions 1702 may perform one or more of the operations as described herein. The instructions 1702 may reside completely, or at least partially, within the memory 1704 and/or within the processor 1708 during execution by the computer system 1700. Accordingly, the databases displayed and described above with reference to FIGS. 2A and 2B may be stored in the memory 1704 and/or the disk unit 1715.

The memory 1704 and the processor 1708 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1700 may include an input device 1725, such as a keyboard or mouse, configured for a user to interact with any of the components of system 1700. It may further include a display 1730, such as a liquid crystal display (LCD), a cathode ray tube (CRT), or any other display suitable for conveying information. The display 1730 may act as an interface for the user to see the functioning of the processor 1708, or specifically as an interface with the software stored in the memory 1704 or the drive unit 1715.

The computer system 1700 may include a communication interface 1736 that enables communications via the communications network 1710. The network 1710 may include wired networks, wireless networks, or combinations thereof. The communication interface 1736 network may enable communications via a number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. A computer system or other apparatus adapted for carrying out the methods described herein is suited to the present disclosure. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A programmable switch comprising:
   an input arbiter to analyze packet headers of incoming packets and determine which of the incoming packets are part of gradient vectors received from worker computing devices that are performing reinforcement learning as a group; and
   an accelerator coupled to the input arbiter, the accelerator comprising a segment counter and configured to:
      receive the incoming packets from the input arbiter;
      assign a segment number to a gradient segment of the gradient vectors, wherein the gradient segment is a corresponding sub-portion of each respective gradient vector of the gradient vectors;
      aggregate and buffer gradient data of the incoming packets that is associated with the segment number;
      track buffering of the aggregated gradient data according to the segment number by incrementing the segment counter upon buffering gradient data from each incoming packet associated with a corresponding worker computing device of the worker computing devices;
      responsive to the segment counter reaching a threshold number, generate an aggregated data packet containing the aggregated gradient data associated with the gradient segment of the gradient vectors; and
      transfer the aggregated data packet to the input arbiter to be transmitted to the worker computing devices.

2. The programmable switch of claim 1, wherein the packet headers comprise a type of service (ToS) field having a first value, and wherein the input arbiter is to read the first value to determine whether the incoming packets are associated with the gradient vectors.

3. The programmable switch of claim 1, wherein the input arbiter is further to forward the aggregated data packet to a packet handling processor of the programmable switch to be sent to the worker computing devices.

4. The programmable switch of claim 1, wherein the accelerator comprises:
   a separator to parse an incoming packet, of the gradient vectors, into a packet header and a payload that includes the gradient segment;
   a segment decoder coupled to the separator, the segment decoder to decode the packet header to identify the segment number of the gradient segment;
   the segment counter coupled to the segment decoder, the segment counter to receive the segment number and track aggregation by assigning the gradient segment an aggregation counter; and
   a slicer coupled to the separator, the slicer to partition the payload into gradient data chunks of a predetermined size.

5. The programmable switch of claim 4, wherein the accelerator further comprises:
   multiple addressable buffers coupled to the segment counter, the multiple addressable buffers to buffer aggregated gradient data of the gradient segment and of the predetermined size as the incoming packets are received;
   a set of adders coupled to the slicer and the multiple addressable buffers, wherein respective adders of the set of adders are to add the gradient data chunks to the aggregated gradient data from the multiple addressable buffers;
   a plurality of multiplexers coupled to the set of adders, the plurality of multiplexers to reinsert the aggregated gradient data of the predetermined size into respective ones of the multiple addressable buffers for further aggregation based on additional ones of the gradient vectors that share the segment number; and
   an address generator coupled between the segment decoder and the multiple addressable buffers, the address generator to generate buffer addresses associated with the segment number in order to align the aggregated gradient data across ones of the multiple addressable buffers.

6. The programmable switch of claim 5, further comprising:

a concatenator coupled to outputs of the set of adders, the concatenator to concatenate the aggregated gradient data from ones of the multiple addressable buffers for the gradient segment;

an output module coupled to the segment counter and to the concatenator, the output module to receive the concatenated aggregated gradient data; and an output first-in-first-out (FIFO) buffer coupled to the output module; and wherein the aggregation counter is to be incremented for the gradient segment until reaching an aggregation threshold that equals a number of the worker computing devices, in response to which the segment counter is to:

reset the aggregation counter;

write the multiple addressable buffers with zeros at an associated buffer address via the plurality of multiplexers; and trigger the output module to transfer the aggregated data packet, containing the concatenated aggregated gradient data and the packet header for the gradient segment, to the output FIFO buffer.

7. The programmable switch of claim 1, wherein the packet headers of the incoming packets comprise a type of service (ToS) field, which indicates that at least one of the incoming packets comprises a control message, wherein the control message comprises an action field indicating to set an aggregation threshold for a number of the worker computing devices participating in the reinforcement learning.

8. The programmable switch of claim 1, wherein the input arbiter and the accelerator are coupled to a membership data structure, which is to track, with individual entries, an identity, an entity type, and a network location of respective ones of the worker computing devices and a plurality of programmable switches involved in the reinforcement learning, wherein the membership data structure is usable to determine forwarding and broadcasting of the aggregated data packet.

9. An accelerator comprising:
a decoding subsystem to parse a packet header and a payload from an incoming packet, wherein the incoming packet is part of gradient vectors received from worker computing devices, and the payload comprises a gradient segment that is assigned a segment number by the decoding subsystem;

an aggregation subsystem coupled to the decoding subsystem, the aggregation subsystem to aggregate gradient data and buffer the aggregated gradient data of the gradient segment as incoming packets of the gradient vectors are received;

a segment counter of the aggregation subsystem to track progress of aggregation of the aggregated gradient data according to the segment number; and an output subsystem coupled to the aggregation subsystem and the segment counter, the output subsystem to concatenate and output an aggregated data packet of the aggregated gradient data for the gradient segment in response to the segment counter indicating the gradient segment has been completely aggregated.

10. The accelerator of claim 9, wherein, for the gradient segment to be completely aggregated, the segment counter for the gradient segment reaches an aggregation threshold equal to a predetermined number of worker computing devices that are performing reinforcement learning.

11. The accelerator of claim 9, wherein the decoding subsystem comprises:

a separator to parse the incoming packet into the packet header and the payload;

a segment decoder coupled to the separator, the segment decoder to decode the packet header to identify the segment number of the gradient segment; and a slicer coupled to the separator, the slicer to partition the payload into gradient data chunks of a predetermined size.

12. The accelerator of claim 9, wherein the segment counter is to receive the segment number and track aggregation by assigning the gradient segment an aggregation counter, and wherein the aggregation subsystem further comprises:

multiple addressable buffers coupled to the segment counter, the multiple addressable buffers to buffer aggregated gradient data of the gradient segment that is of a predetermined size as the incoming packets are received;

a set of adders coupled to the multiple addressable buffers, wherein respective adders of the set of adders to add gradient data chunks, from the gradient segment, to the aggregated gradient data from respective ones of the multiple addressable buffers;

a plurality of multiplexers coupled to the set of adders, the plurality of multiplexers to reinsert the aggregated gradient data of the predetermined size into respective ones of the multiple addressable buffers for further aggregation based on additional ones of the gradient vectors that share the segment number; and an address generator coupled to the multiple addressable buffers, the address generator to generate buffer addresses associated with the segment number in order to align the aggregated gradient data across ones of the multiple addressable buffers.

13. The accelerator of claim 12, wherein the output subsystem comprises:

a concatenator coupled to outputs of the set of adders, the concatenator to concatenate the aggregated gradient data from ones of the multiple addressable buffers for the gradient segment;

an output module coupled to the segment counter and to the concatenator, the output module to receive the concatenated aggregated gradient data; and an output first-in-first-out (FIFO) buffer coupled to the output module.

14. The accelerator of claim 13, wherein, in response to the aggregation counter indicating the gradient segment has been completely aggregated, the segment counter to:

reset the aggregation counter;

write the multiple addressable buffers with zeros at an associated buffer address via the plurality of multiplexers; and trigger the output module to transfer the aggregated data packet, containing the concatenated aggregated gradient data and packet header for the gradient segment, to the output FIFO buffer.

15. A method comprising:
analyzing, by an input arbiter, packet headers of incoming packets of a programmable switch to determine which of the incoming packets are part of gradient vectors received from worker computing devices that are performing reinforcement learning as a group;

transferring, by the input arbiter, the incoming packets to an accelerator coupled to the input arbiter;

assigning, by the accelerator, a segment number to a gradient segment of the gradient vectors, wherein the gradient segment is a corresponding sub-portion of each respective gradient vector of the gradient vectors;

aggregating and buffering, by the accelerator, gradient data of the incoming packets that is associated with the segment number;

tracking buffering of the aggregated gradient data according to the segment number by incrementing a segment counter upon buffering gradient data from each incoming packet associated with a corresponding worker computing device of the worker computing devices;

responsive to the segment counter reaching a threshold number, generating an aggregated data packet containing the aggregated gradient data associated with the gradient segment of the gradient vectors; and transferring, by the accelerator, the aggregated data packet to the input arbiter to be forwarded back to the worker computing devices.

16. The method of claim 15, wherein the packet headers comprise a type of service (ToS) field having a first value, the method further comprising analyzing, by the input arbiter, the first value to determine whether the incoming packets are associated with the gradient vectors.

17. The method of claim 15, further comprising transferring, by the input arbiter, the aggregated data packet to a packet handling processor of the programmable switch to be transmitted to the worker computing devices.

18. The method of claim 15, further comprising:
parsing, by a separator, a gradient vector, of the gradient vectors, into a packet header and a payload that includes the gradient segment;

decoding, by a segment decoder, the packet header to identify a segment number of the gradient segment of the gradient vector;

tracking, by the segment counter, data aggregation of the gradient segment by assigning the gradient segment an aggregation counter; and partitioning, by a slicer, the payload into gradient data chunks of a predetermined size.

19. The method of claim 15, further comprising:
buffering, within multiple addressable buffers, aggregated gradient data of the gradient segment and of a predetermined size as the incoming packets are received;

adding, by a set of adders to perform further aggregation, respective gradient data chunks of the gradient segment to the aggregated gradient data from respective ones of the multiple addressable buffers;

reinserting, using a plurality of multiplexers coupled to the set of adders, the aggregated gradient data of the predetermined size into respective ones of the multiple addressable buffers for further aggregation based on additional ones of the incoming packets that share a segment number; and generating, by an address generator coupled to the multiple addressable buffers, buffer addresses associated with the segment number in order to align the aggregated gradient data across ones of the multiple addressable buffers.

20. The method of claim 19, further comprising:
concatenating, by a concatenator coupled to outputs of the set of adders, the aggregated gradient data from respective ones of the multiple addressable buffers for the gradient segment;

receiving the concatenated aggregated gradient data by an output module coupled to the concatenator;

detecting, by a segment counter for the gradient segment, that an aggregation counter of the segment counter has reached an aggregation threshold equaling a number of the worker computing devices;

triggering the output module, by the segment counter in response to the detecting, to transfer the concatenated aggregated gradient data for the gradient segment as the aggregated data packet to an output first-in-first-out (FIFO) buffer; and transferring, by the output FIFO buffer, the aggregated data packet to the input arbiter.

21. The method of claim 15, further comprising:
determining, based on an action field of at least one of the packet headers, that an incoming packet comprises a control message to set an aggregation threshold; and setting, by the accelerator, an aggregation threshold consistent with a value within a value field of the incoming packet, the aggregation threshold equaling a number of the worker computing devices participating in the reinforcement learning.

22. The method of claim 15, further comprising:
accessing, within a lightweight membership data structure, individual entries each of which comprises an identity, an entity type, and a network location of respective ones of the worker computing devices and a plurality of programmable switches involved in the reinforcement learning; and at least one of forwarding or broadcasting the aggregated data packet, to the worker computing devices, based on information for an entry in the lightweight membership data structure.

* * * * *